(12) United States Patent
Maki et al.

(10) Patent No.: US 7,623,816 B2
(45) Date of Patent: Nov. 24, 2009

(54) BELT CONVEYANCE APPARATUS AND IMAGE FORMING APPARATUS USING SUCH A BELT CONVEYANCE APPARATUS

(75) Inventors: Tsuneo Maki, Kanagawa (JP); Tomiyoshi Misumi, Kanagawa (JP); Kiyoshi Tsukamura, Kanagawa (JP); Yohichi Itoh, Kanagawa (JP); Hideo Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 257 days.

(21) Appl. No.: 10/532,852

(22) PCT Filed: Sep. 15, 2004

(86) PCT No.: PCT/JP2004/013865

§ 371 (c)(1),
(2), (4) Date: Dec. 14, 2005

(87) PCT Pub. No.: WO2005/028349

PCT Pub. Date: Mar. 31, 2005

(65) Prior Publication Data

US 2006/0233578 A1     Oct. 19, 2006

(30) Foreign Application Priority Data

Sep. 17, 2003     (JP) ............................. 2003-324927

(51) Int. Cl.
*G03G 15/20*     (2006.01)
(52) U.S. Cl. .................. 399/312; 399/163; 399/164; 399/372
(58) Field of Classification Search ................ 399/312, 399/163, 164, 372
See application file for complete search history.

(56) References Cited

U.S. PATENT DOCUMENTS

| 5,615,000 A | 3/1997 | Ueda et al. | |
| 5,873,016 A * | 2/1999 | Kurokawa et al. | 399/297 |
| 2002/0085864 A1* | 7/2002 | Abe | 399/299 |
| 2002/0110392 A1* | 8/2002 | Omata et al. | 399/303 |

FOREIGN PATENT DOCUMENTS

JP     59-11838     1/1984

(Continued)

OTHER PUBLICATIONS

Ohata et al., JP 2002193471, Jul. 10, 2002, Machine Translation.*

(Continued)

*Primary Examiner*—David M Gray
*Assistant Examiner*—Ryan D Walsh
(74) *Attorney, Agent, or Firm*—Cooper & Dunham, LLP

(57) ABSTRACT

In an intermediate transfer part (100), a bead 107 is formed on an inner side of an intermediate transfer belt (102), which is rotated by an intermediate transfer belt drive roller (101). Driven roller bearings (104a, 104b) support an intermediate transfer belt driven roller (103). The intermediate transfer belt driven roller (103) is movable in a thrust direction. Ends of the intermediate transfer belt driven roller (101) and the intermediate transfer belt driven roller (103) interfere with a bead (107) so as to restrict a deflection of the intermediate transfer belt in the thrust direction. The intermediate transfer belt driven roller (103) is movable in the thrust direction against a deflection of the intermediate transfer belt (102).

26 Claims, 12 Drawing Sheets

FOREIGN PATENT DOCUMENTS

| | | |
|---|---|---|
| JP | 64-48457 | 3/1989 |
| JP | 3-73541 | 7/1991 |
| JP | 4-98284 | 3/1992 |
| JP | 4-169440 | 6/1992 |
| JP | 04169440 A * | 6/1992 |
| JP | 4-246042 | 9/1992 |
| JP | 5-306037 | 11/1993 |
| JP | 05306037 A * | 11/1993 |
| JP | 6-40591 | 2/1994 |
| JP | 2000-284607 | 10/2000 |
| JP | 2001-80782 | 3/2001 |
| JP | 2001-163424 | 6/2001 |
| JP | 2002060085 A * | 2/2002 |
| JP | 2002-193471 | 7/2002 |
| JP | 2002193471 A * | 7/2002 |
| JP | 2003-95472 | 4/2003 |
| JP | 2003-215943 | 7/2003 |

OTHER PUBLICATIONS

Kawaishi et al., JP 05306037, Nov. 19, 1993, Machine Translation.*
Jul. 15, 2008 official action in connection with a counterpart Japanese patent application No. 2003-324927.

* cited by examiner

BELT CONVEYANCE APPARATUS AND IMAGE FORMING APPARATUS USING SUCH A BELT CONVEYANCE APPARATUS

TECHNICAL FIELD

This disclosure generally relates to image forming apparatuses and, more particularly, to an image forming apparatus using a belt conveyance apparatus provided with a drive roller, a driven roller and an endless belt engaged with the drive roller and the driven roller.

BACKGROUND ART

A conventional belt conveyance apparatus has an endless guide member in a part extending from an end surface of a conveyance roller on a conveyance belt so that the endless guide member is engaged with a partition plate provided on a side of ends of a drive roller and a driven roller (may be referred to as a follower roller or an idle roller) (for example, refer to patent document 1). According to the above structure, there is no stress generated in the endless guide member if the conveyance belt moves in a zigzag direction and a pressure force is exerted on the conveyance belt and an elongation occurs, and a flatness of the conveyance belt is maintained.

Additionally, there is a belt conveyance apparatus having a support frame for rotatably supporting a driven roller engaged with a conveyance belt and a support means for supporting a central portion of the support frame via a spring so as to support the driven roller in a seesaw state (for example, refer to patent document 2). According to this structure, if the conveyance belt tends to deflect on the driven roller, the driven roller shifts to follow the deflection, which results in correction of zigzag movement of the conveyance belt.

Moreover, there is a belt conveyance apparatus which countervails a deflecting force of a conveyance belt caused by a twist between axes of a drive roller and a driven roller by appropriately selecting a direction of twist of wefts (strings extending in a circumferential direction) and a number twist turns in a core material of the conveyance belt (for example, refer to patent document). Here, the conveyance belt in which a deflecting force opposite to the deflecting force of the drive mechanism of the conveyance belt is applied.

Further, there is a belt conveyance apparatus comprising a backup roller engaged with a conveyance belt provided with a bear, a transfer roller which sandwiches and presses the conveyance roller with the backup roller and disengageably engages with the backup roller, and a tension canceling means that cancels a tension when the conveyance belt is not driven, wherein when the tension of the conveyance belt is cancelled, the transfer roller is brought into contact with the conveyance belt so as to prevent the bead of the conveyance belt from being disengaged from the-backup roller (for example, refer to patent document 4).

Patent document 1: JP2003-095472,A (paragraphs 0011 and 0012 of page 3, FIG. 1, FIG. 2)
Patent document 2: JP04-246042,A (paragraph 0019 of page 3 to paragraph 0031 of page 4, FIG. 1)
Patent document 3: JP06-040591,A (paragraph 0016 of page 3 to paragraph 0020 of page 4, FIG. 1, FIG. 2)
Patent document 4: JP2000-284607,A (paragraphs 0085 to 0095 of page 8, FIG. 8, FIG. 9)

In the conventional belt driving apparatus, when a driven roller adjacent to a drive roller or a support shaft thereof is twisted relative to the drive roller or a support shaft thereof, if a conveyance belt is deflected relative to the axial direction of the driven roller, the support shaft of the driven roller tends to move in a direction opposite to a deflecting direction of the conveyance belt. However, with such a belt driving apparatus, since the support shaft of the driven roller engaged with a conveyance belt is restricted or fixed so as to not move in the axial direction (generally horizontal direction), it is considered that there is a case in which the driven roller cannot follow the deflection. Thus, it is desired to maintain further flatness of the conveyance belt and flatness of papers.

SUMMARY

In an aspect of this disclosure, there is provided a belt conveyance apparatus used for an image forming apparatus in which a driven roller engaged with a conveyance belt can move in an axial direction so that a deflection of the conveyance belt can be corrected by the movement of the driven roller.

In addition, there is provided a belt conveyance apparatus comprising: a drive roller; a driven roller rotating in accordance with an operation of the drive roller; a conveyance belt engaged with the drive roller for rotationally driving the conveyance belt and the driven roller, the conveyance belt being provided with a bead formed on an inner side thereof; and driven roller support means for movably supporting the driven roller in a thrust direction, wherein, in operation, ends of the drive roller and the driven roller interface with the bead of the conveyance belt so as to restrict a deflection of the conveyance belt in the thrust direction, and the driven roller is movable in the thrust direction against a deflection of the conveyance belt.

In the belt conveyance apparatus according to the present invention, the bead may be formed on each side of the conveyance belt in a direction of width thereof, and a clearance between a first end of the driven roller and the driven roller support means on a side of the first end of the driven roller may be greater than a sum of a first clearance between a second end of the driven roller and the bead located on a side of the second end of the driven roller, a second clearance between a first end of the drive roller and the bead on a side of the first end of the drive roller, and a third clearance between a second end of the drive roller and the bead located on a side of the second end of the drive roller.

In the belt conveyance apparatus according to the present invention, the bead may be provided on an inner side of the conveyance belt, and a groove may be formed on a circumferential surface of the drive roller so that the bead is brought into engagement with the groove.

Additionally, the belt conveyance apparatus according to the present invention, a coefficient of friction between an end portion of the drive roller and the bead may be set smaller than a coefficient of friction of a center portion of the drive roller and the bead. The taper may be formed on an end surface of the drive roller so that, in an unoperated state, a non-tapered portion of the end surface overlaps a side surface of the bead. The belt conveyance apparatus may further comprise a first rotational member constituting the center portion of the drive roller and a second rotational member constituting the end portion of the drive roller, wherein an outer diameter of the second rotational member is within a range of ±1.0 mm of an outer diameter of the first rotational member. A taper angle of the taper with respect to the end surface of the drive roller may be set in a range from 10 degrees to 45 degrees.

Additionally, in the belt conveyance apparatus according to the present invention, an axis of the drive roller and an axis of the driven roller may be substantially perpendicular to a direction of conveyance of a paper sheet, and the axis of the driven roller may be inclined with respect to the axis of the drive roller. The bead may be formed on one side of an inner surface of the conveyance belt so that, in an operated stated, the bead interferes with a lower one of opposite ends of the driven roller in operation. A taper may be formed on an end surface of the drive roller so that, in an unoperated stated, a non-tapered portion of the end surface overlaps a side surface of the bead. A taper angle of the taper with respect to the end surface of the drive roller may be set in a range from 10 degrees to 45 degrees.

In the belt conveyance apparatus according to the present invention, a frictional force in the thrust direction between the driven roller support means and the driven roller may be smaller than a frictional force of the driven roller and the conveyance belt.

In the belt conveyance apparatus according to the present invention, a coefficient of friction between the drive roller and the conveyance belt may be greater than a coefficient of friction between the driven roller and the conveyance belt.

The belt conveyance apparatus according to the present invention may further comprise pressing means for pressing the conveyance belt to the drive roller, wherein the pressing means is located at a position opposite to the drive roller with the conveyance belt interposed therebetween.

Additionally, there is provided according to another aspect of the present invention an image forming apparatus comprising: image forming means for forming an image; and a belt conveyance apparatus including: a driven roller rotating in accordance with an operation of the drive roller; a conveyance belt engaged with the drive roller for rotationally driving the conveyance belt and the driven roller, the conveyance belt being provided with a bead formed on an inner side thereof; and driven roller support means for movably supporting the driven roller in a thrust direction, wherein, in operation, ends of the drive roller and the driven roller interface with the bead of the conveyance belt so as to restrict a deflection of the conveyance belt in the thrust direction, and the driven roller is movable in the thrust direction against a deflection of the conveyance belt.

According to the present invention, the driven roller is rotatably supported, and the driven roller support means is provided to movably support the driven roller in the thrust direction, and the drive roller and the end of the driven roller interfere with the conveyance belt so as to restrict a deflection of the conveyance belt in the thrust direction and the driven roller is movable in the thrust direction against the deflection of the conveyance belt. Thus, there is an effect that the deflection of the conveyance belt can be corrected by the movement of the driven roller. The present invention is effective and useful for a belt conveyance apparatus having an endless belt, a drive roller driving the endless belt and at least one driven roller engaged with the endless belt, and an image forming apparatus having such a belt conveyance apparatus.

Other aspects, features and advantages will become more apparent from the following detailed description when read in conjunction with the accompanying drawings.

BEST MODE FOR CARRYING OUT THE INVENTION

A description will now be given, with reference to the drawings, of preferred embodiments of the present invention.

First Embodiment

Figure 1:
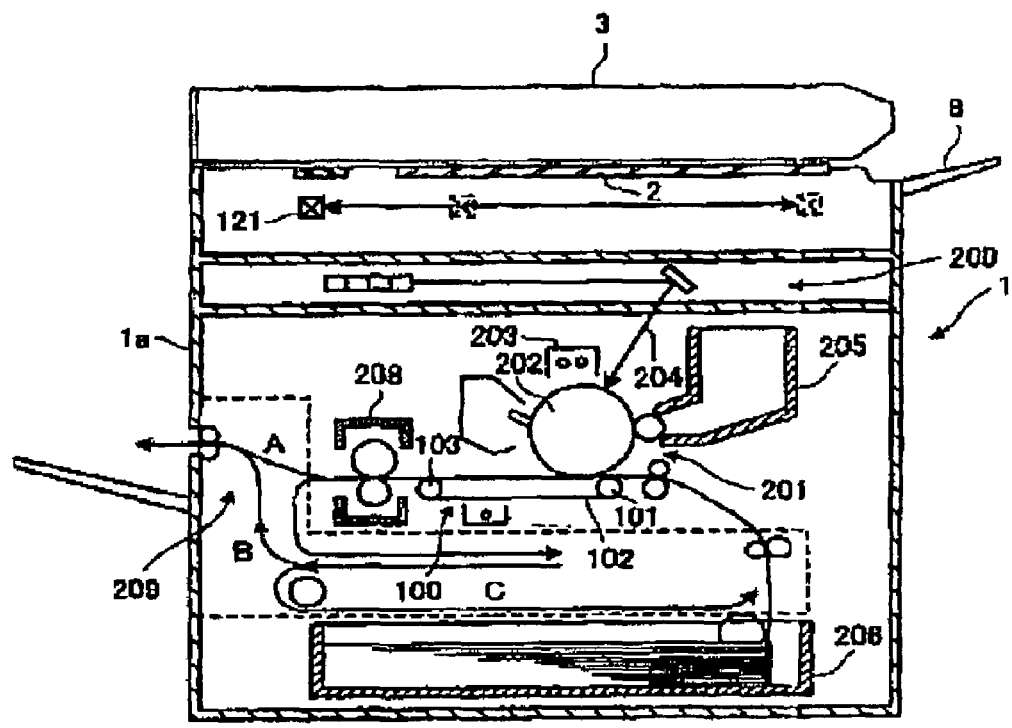
FIG. 1 is an illustration of an entire structure of a digital copy machine as an image forming apparatus to which a belt conveyance apparatus according to a first embodiment of the present invention is applied.

FIG. 1 shows an entire structure of a digital copy machine as an image forming apparatus to which a belt conveyance apparatus according to a first embodiment of the present invention is applied. It should be noted that the present invention is not limited to digital copy machines, and is applicable to wide variety of apparatuses if they have a belt conveyance part, such as a facsimile apparatus, a printer (including an inkjet printer), etc.

Provided on a top surface of a main body 1a of the digital copy machine 1 are a contact glass 2 and a slit glass having an area smaller than the contact glass 2. Additionally, an automatic document feeder 3 (hereinafter, may be abbreviated as "ADF") is provided via a hinge mechanism (not shown) on the main body 1a of the digital copy machine 1 (in this example, it is placed on the contact glass 2 and slit glass). The ADF 3 is movable relative to the contact glass 2 and the slit glass so as to open or close a space above the contact glass 2 and the slit glass. The ADF 3 separates document sheets, which are taken out of a bundle of document sheets P placed on a document tray 4 (shown in FIG. 2), one by one, and feeds each document sheet to a reading position on the contact glass 2. Thereafter, the ADF 3 ejects each document sheet to a first paper eject tray 8 or a second paper eject tray.

Under the contact glass 2 of the main body 1a, there is provided a scanner 121 having an image sensor composed of an exposure lamp, a mirror, a lens and a charge coupled device (CCD). The scanner 121 is movable by a drive apparatus (not shown) in leftward and rightward directions in FIG. 1. When reading image information of a document sheet, which is fed to the reading position on the contact glass 2 and stopped at the reading position, the drive apparatus moves the scanner 121 in the leftward and rightward directions in accordance with a control of a main control part (not shown in the figure). When reading image information of a document sheet while feeding the document sheet from a position on the slit glass to a position on the contact glass 2, the drive apparatus causes the scanner 121 to stop at a position under the reading position.

The image information acquired by reading a document sheet by the scanner 121 is output as image data to the main control part. The main control part causes the input image data to be written on a photo-conductor dram 202 that constitute an image forming part 201 (corresponding to "image forming means") by an optical system 200 so as to form an electrostatic latent image on the photo-conductor drum 202. Then, the main control part causes a charge part 203, an exposure part 204 and a development part 205, which together constitute the image forming pan 201, to form a visible toner image on the photo-conductor drum 202. The visible toner image is further transferred onto an intermediate transfer belt 102, which is engaged with an intermediate transfer belt drive roller 101 and an intermediate transfer belt driven roller 103, in an intermediate transfer part 100 that constitutes the image forming part 201.

On the other hand, a transfer paper fed from a transfer paper feed system 206 under a control of the main control part is fed to the intermediate transfer belt of the image forming part 201 in synchronization with the image forming operation. Then, a toner (toner image) is transferred onto a first surface of the transfer paper from the intermediate transfer belt 102. Thereafter, the toner on the transfer paper is fixed by a fixation system 208, and, then, the transfer paper is conveyed to a transfer reversal paper eject part 209.

Here, a path A in the transfer reversal paper eject part 209 is a path for immediately ejecting a transfer paper out of the digital copy machine (image forming apparatus) 1. A path B is a path for reversing a transfer paper in the transfer reversal paper eject part 209 and, thereafter, ejecting the reversed transfer paper out of the apparatus. Further, a path C is a path for reversing a transfer paper within the transfer reversal paper eject part 209, and feeding the reversed transfer paper in a both-side tray. The transfer paper after a toner image is transferred and fixed on a second surface of the transfer paper is ejected out of the apparatus through the path A.

Figure 2:
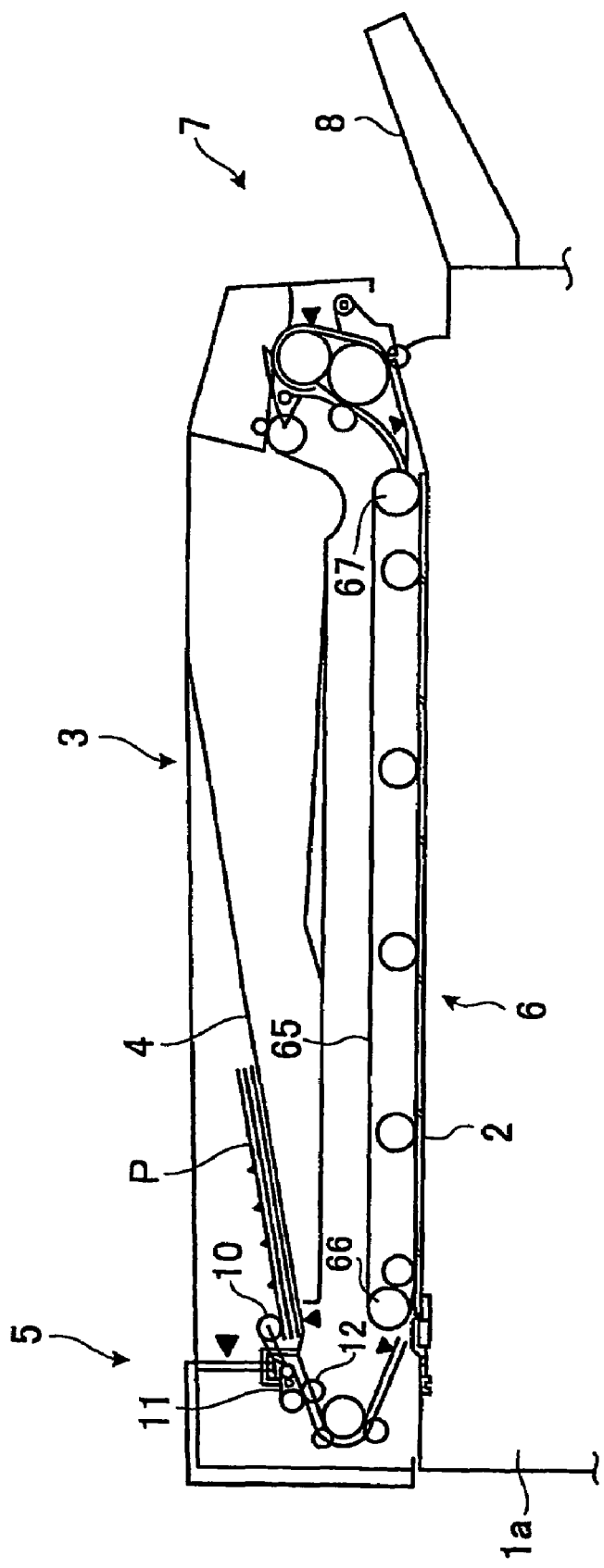
FIG. 2 is an illustration of an outline structure of an automatic document feeder shown in FIG. 1.

FIG. 2 shows an outline structure of the ADF 3 shown in FIG. 1.

The ADF 3 comprises a paper separation/supply part 5, a carry in/out part 6 and a paper eject part 7. The paper separation/supply part 5 separates document sheets of a bundle of document placed on the document tray 4, one by one, and, thereafter, conveys each separated document sheet toward the contact glass 2. The carry in/out pan 6 conveys each document sheet conveyed to the contact glass 2 by the paper separation/supply part 5 and stops at an exposure position (corresponding to the "reading position"), and conveys each document sheet, of which a reading operation has been completed, out of the contact glass 2. The paper eject part 7 ejects each document sheet, which is conveyed out of the exposure position by the carry in/out part 6, to one of the first paper eject tray 8 protruding from a side of the digital copy machine 1 and the second paper eject tray located under the document tray 4.

It should be noted that, in the paper separation/supply part 5, a bundle of document sheet is placed on the document sheet so that an image on each document sheet to be read faces upward. A pickup roller 10 is provided for taking a document sheet on a top of the bundle P of document sheets by contacting to and separating from the bundle P of the document sheets by being swung by a swing mechanism (not shown in the figure). A paper supply belt 11 and a separation roller 12 together separate the document sheets taken by the pickup roller 10 one by one, and convey only an uppermost document sheet to a pair of pull-out rollers. Additionally, in the carry in/out part 6, a conveyance belt 65, which is an endless belt wound on both a conveyance belt drive roller 66 and a conveyance belt driven roller 67, is circulated by being driven by the conveyance belt drive roller 66 so as to convey the document sheet on the contact glass 2.

Figure 3:
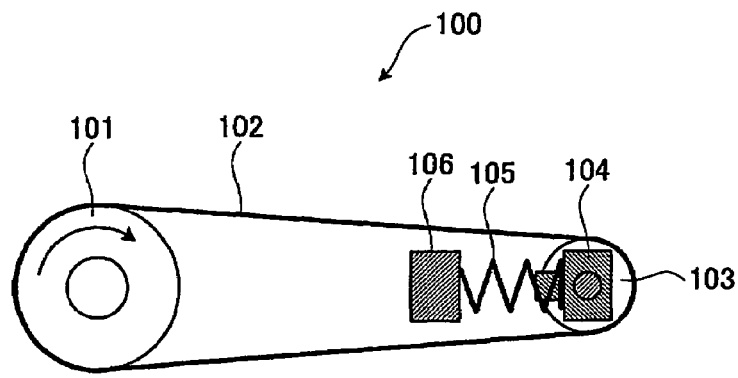
FIG. 3 is a side view of an intermediate transfer part provided in the digital copy machine according to the first embodiment of the present invention.
Figure 4:
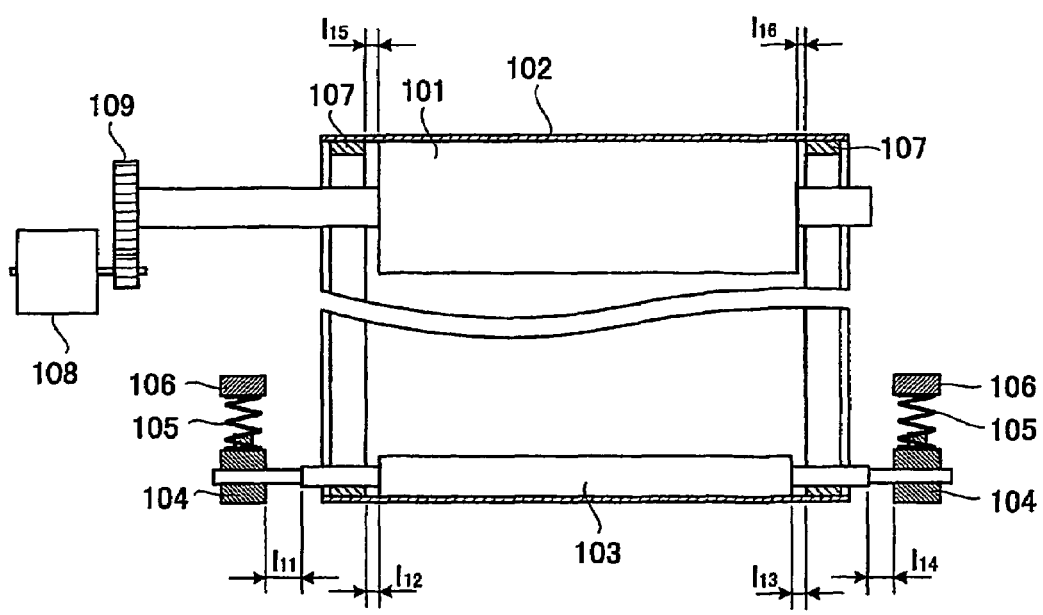
FIG. 4 is a plan view of the intermediate transfer part provided in the digital copy machine according to the first embodiment of the present invention.
Figure 5A:
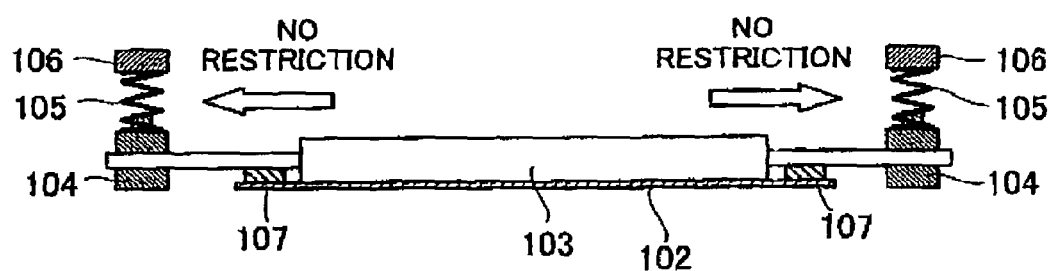
FIG. 5A is an illustration for explaining an operation of an intermediate transfer belt driven roller 3 during a belt conveyance operation.
Figure 5B:
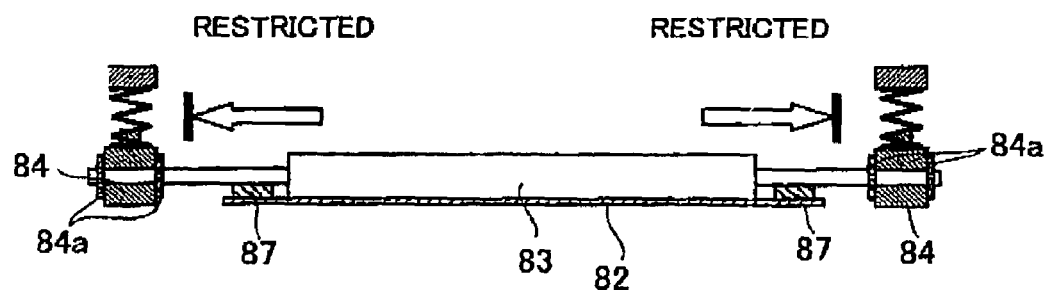
FIG. 5B is an illustration for explaining an operation of an intermediate transfer belt driven roller 3 provided in a conventional intermediate transfer part during a belt conveyance operation.

FIG. 3 shows a side view of the intermediate transfer part 100. FIG. 4 is a plan view of the intermediate transfer part 100. It should be noted that the FIGS. 5A and 5B illustrate an operation of the intermediate transfer belt driven roller 103 during a belt conveyance operation.

In the intermediate transfer part 100, the intermediate transfer belt drive roller 101 is supported by a structural body (not shown in the figure). A drive power transmission gear 109 is mounted to a shaft of the intermediate transfer belt drive roller 101 so as to transmit a drive power of a drive motor 108. The intermediate transfer belt drive roller 101 is rotated by a drive force generated by the drive motor 108, and is restricted in a movement in a thrust direction (longitudinal direction).

The intermediate transfer belt driven roller 103 is rotatably supported by driven roller bearings 104, and is movable by a predetermined distance due to an external force exerted in an axial direction. Additionally, the driven roller bearing 104 is urged by a spring 105 fixed to a spring support part (structural body) 106 so as to apply a predetermined tension to the intermediate transfer belt 102 due to a driving force generated by the spring 105. Here, clearances $I_{11}$ and $I_{14}$ are provided between the intermediate transfer belt driven roller 103 and each of the left and right driven roller bearings 104.

The annular intermediate transfer belt 102 is engaged with the intermediate transfer belt drive roller 101 and the intermediate transfer belt driven roller 103, and is rotationally driven by a drive force generated by a drive motor 109. Additionally, a string-like protrusion (hereinafter, may be referred to as a "bead") 107 is formed on each end of the intermediate transfer belt in a direction of width. The beads 107 are attached to both ends of the intermediate transfer belt 102 in the direction of width by, for example, a pressure-sensitive tape (generally referred to as a both-side tape).

Here, in order to acquire an accuracy of conveyance by the intermediate transfer belt 102, a coefficient of friction between the intermediate transfer belt drive roller 101 and the intermediate transfer belt 102 is set greater than a coefficient of friction between the intermediate transfer belt driven roller 103 and the intermediate transfer belt 102. It should be noted that clearances $l_{12}$ and $l_{13}$ are provided between the intermediate transfer belt driven roller 103 and each of the left and right beads 107, respectively. Gaps $l_{15}$ and $l_{16}$ (hereinafter, may be referred to as clearances) are provided between the intermediate transfer belt drive roller 101 and each of the left and right beads 107.

According to the above-mentioned structure, an amount of conveyance of the intermediate transfer belt 102 is decided by the drive of the intermediate transfer belt drive roller 101, and the intermediate transfer belt drive roller 101 regulates a deflection of the intermediate transfer belt 102. Additionally, if there exists a twist in the intermediate transfer belt driven roller 103 (described later in FIG. 11), a friction generated between the intermediate transfer belt driven roller 103 and the intermediate transfer belt 102 determines the a deflection force of the intermediate transfer belt 102. Thus, the deflection force is controlled by setting a friction generated between the intermediate transfer belt drive roller 103 and the intermediate transfer belt 102 smaller than a friction generated between the intermediate transfer belt driven roller 103 and the intermediate transfer belt 102. Moreover, a friction generated between the intermediate transfer belt drive roller 101 and the intermediate transfer belt 102 receives a deflection of the intermediate transfer belt 102 in a state of an initial value. Thus, the friction between the intermediate transfer belt drive roller 101 and the intermediate transfer belt 102 is set greater than the friction between the intermediate transfer belt driven roller 103 and the intermediate transfer belt 102. Accordingly, the intermediate transfer belt 102 is prevented from being displaced greatly from an initial position at which the intermediate transfer belt is initially located.

Further, according to the above-mentioned structure, a force to cancel the deflecting force is dispersed by the beads 107 so s to stabilize the conveyance by the intermediate transfer belt 102 without giving a load to the beads 107. Specifically, the beads 107 formed on the intermediate transfer belt 102 tend to interfere with the intermediate transfer belt drive roller 101 and the intermediate transfer belt driven roller 103, which tends to restrict the roller position. Here, since the clearances $l_{15}$ and $l_{16}$ exist between the intermediate transfer belt drive roller 101 and each of the beads 107, the intermediate transfer belt 102 can be swung in the thrust direction by the clearances relative to the intermediate transfer belt drive roller 101. On the other hand, although the left and right driven roller bearings 104 are slidable in a direction in which a tension is applied by the spring 105, the left and right driven roller bearings 104 are fixed to a structural body (not shown in the figure) so as to not move in a thrust direction of the intermediate transfer belt driven roller 103. And the intermediate transfer belt driven roller 103 can be swung in a thrust direction relative to the driven roller bearings 104 by distances corresponding to the clearances $l_{11}$ and $l_{14}$, respectively. Especially, it is set that the intermediate transfer belt driven roller 103 is swingable in the thrust direction by a predetermined amount, and relationships $l_{11}>(l_{12}+l_{15}+l_{16})$ and $l_{14}>(l_{13}+l_{15}+l_{16})$ are established.

A description will now be given, with reference to FIG. 5A, of an operation of the intermediate transfer part 100.

When the intermediate transfer belt driven roller 103 moved in a leftward direction in the figure during a circular movement of the intermediate transfer belt 102, the clearance $l_{11}$ first becomes "0", and, further, the intermediate transfer belt 102 moves in the leftward direction in the figure until the clearance $l_{12}$ becomes "0". In this state, the intermediate transfer belt 102 tends to move in the rightward direction but is restricted by the left-end part of the intermediate transfer belt driven roller 103. Additionally, an amount of movement of the intermediate transfer belt 102 is restricted by the right-end part of the intermediate transfer belt drive roller 101. On the other hand, when the intermediate transfer belt driven roller 103 moves in a rightward direction, the intermediate transfer belt driven roller 103 moves in the rightward direction until the clearance $l_{13}$ becomes "0", and moves further in the rightward direction together with the intermediate transfer belt 102. Then, the clearance $l_{15}$ becomes "0" and, the intermediate transfer belt 102 is stopped at a position where the intermediate transfer belt drive roller 101 interferes with the bead 107 in the left end part of the intermediate transfer belt 102. Thus, the movement of the intermediate transfer belt 102 in the rightward direction is restricted by the right-end part of the intermediate transfer belt driven roller 103, and is restricted in the movement in the rightward direction in the figure by the left-end side of the intermediate transfer belt drive roller 101. That is, since the intermediate transfer belt driven roller 103 is movable relative to the driven roller bearings 104 by a predetermined distance in the thrust direction, the movement of the beads 107 is restricted by the movement of the intermediate transfer belt driven roller 103, which results in stabilization of the conveyance state.

On the other hand, with the conventional technique, as shown in FIG. 5B, a shaft of an intermediate transfer belt driven roller 83 is fixed by thrust fixation members 84a to driven roller bearings 84. For this reason, it is difficult to restrict a movement of beads 87 formed on an intermediate transfer belt 82 since the intermediate transfer belt driven roller 83 cannot be moved in the thrust direction. It should be noted that as one of factors causing the deflecting force of the intermediate transfer belt 82, there is a twist between the intermediate transfer belt drive roller and the intermediate transfer belt driven roller 83. Since a coefficient of friction between the intermediate transfer belt driven roller 83 and the intermediate transfer belt 82 is smaller than a coefficient of friction between the intermediate transfer belt driven roller 83 and the intermediate transfer belt drive roller, if the intermediate transfer belt 82 is supported by more than two axes, the intermediate transfer belt driven roller 83, which is located immediately downstream side of the intermediate transfer belt drive roller in a conveyance direction is subjected to a deflection force of the intermediate transfer belt 82. Generally, it was found that the intermediate transfer belt driven roller 83 moves in a direction opposite to the direction of deflection of the intermediate transfer belt driven roller 83 when the intermediate transfer belt 82 moves (deflects) leftward or rightward in a state where the intermediate transfer belt driven roller 83 is twisted. Thus, the deflection of the intermediate transfer belt 82 can be cancelled by a movement of the intermediate transfer belt driven roller 83 if the intermediate transfer belt driven roller 83 is movable in the thrust direction.

As mentioned above, in the first embodiment of the present invention, the intermediate transfer part 100 (corresponding to the belt conveyance apparatus) comprises: the intermediate transfer belt drive roller 101 (corresponding to the drive roller) for rotating the intermediate transfer belt 102 (corresponding to the conveyance belt); the intermediate transfer belt driven roller 103 (corresponding to the driven roller) that rotates according to a drive of the intermediate transfer belt drive roller 101; the intermediate transfer belt 102 provided with the beads 107 on an inner side and engaged with the intermediate transfer belt drive roller 101 and the intermediate transfer belt driven roller 103; and the driven roller bearings 104 (corresponding to the driven roller support means) that movably supports the intermediate transfer belt driven roller 103 in the thrust direction, wherein a deflection of the intermediate transfer belt 102 in the thrust direction is restricted by the ends of the intermediate transfer belt drive roller 101 and the intermediate transfer belt driven roller 103 being brought into interference with the beads 107 of the intermediate transfer belt 102, and the intermediate transfer belt drive roller 103 is movable in the thrust direction against the deflection of the intermediate transfer belt 102, thereby moving the intermediate transfer belt driven roller 103 which suppresses the deflection of the intermediate transfer belt 102.

Moreover, in the present embodiment, the beads 107 are formed on both sides of the inner surface of the intermediate transfer belt 102 in the direction of width, and the clearance $l_{11}$ or $l_{14}$ (corresponding to the clearance between a first end of the driven roller and the driven roller support means) is set to be greater than a sum of the clearance $l_{12}$ or $l_{13}$ (corresponding to the first clearance), the clearance $l_{15}$ (corresponding to the second clearance) and the clearance $l_{16}$ (corresponding to the third clearance), and, thus, the intermediate transfer belt driven roller 103 is movable in the thrust direction by a distance larger than the clearance between the intermediate transfer belt drive roller 101 and the bead 107 and the clearance between the clearance between the intermediate transfer belt driven roller 103 and the bead 107.

Further, in the present embodiment, a coefficient of friction between the intermediate transfer belt drive roller 101 and the intermediate transfer belt 102 is set greater than a coefficient of friction between the intermediate transfer belt driven roller 103 and the intermediate transfer belt 102, and, thus, the image is prevented from being degraded due to slippage during the conveyance of the transfer paper on which the image is formed. Moreover, since a friction force of the intermediate transfer belt driven roller 103 adjacent to the intermediated transfer belt drive roller 101 is smaller than a friction force by the intermediated transfer belt drive roller 101, a high-accuracy of the belt conveyance can be achieved while reducing a deflection of the intermediate transfer belt 102.

It should be noted that although, in the above-mentioned embodiment, a description was given of a case in which the intermediate transfer belt 102 is supported by two axes, that is, the intermediate transfer belt drive roller 101 and the intermediate transfer belt driven roller 103, the present invention is applicable to a case where the intermediate transfer belt 102 is supported by more than three axes with the same effect.

Moreover, although, in the present embodiment, a description was given of a case where the present invention is applied to the intermediate transfer part 100 constituting the image forming part of the digital copy machine, the present invention is applicable to the conveyance belt 65, the conveyance belt drive roller 66 and the conveyance belt driven roller in the carry in/out part 6 of the ADF 3 with the same effect.

Second Embodiment

A digital copy machine according to a second embodiment of the present invention has the same structure as the digital copy machine according to the first embodiment of the present invention except for a part of the intermediate transfer part 100, and, thus, FIGS. 1, 2, 3 and 5A are used for the description of the second embodiment and the same component parts are given the same reference numerals.

Figure 6:
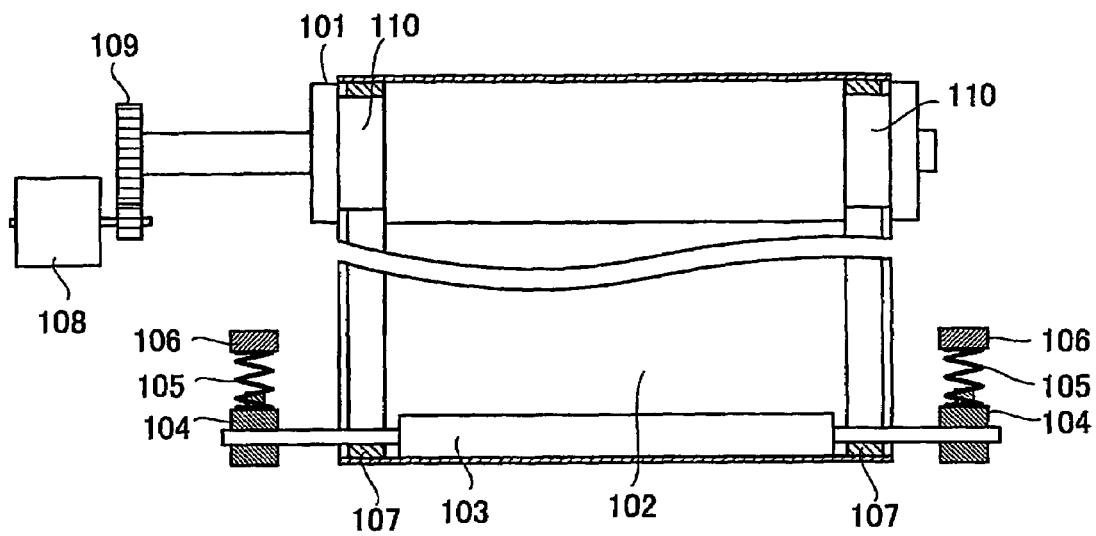
FIG. 6 is a plan view of a part of an intermediate transfer part of a digital copy machine according to a second embodiment of the present invention.

FIG. 6 shows a plan view of a part of the intermediate transfer part of the digital copy machine according to the second embodiment of the present invention.

In FIG. 6, grooves 110 for receiving the beads 107 of the intermediate transfer belt 102 are formed on the circumferential surface the intermediate transfer belt drive roller 101. Here, the grooves 110 are formed on both sides of the intermediate transfer belt drive roller 110 in the direction of width. It should be noted that the operation shown in FIG. 5A is the same as the case where the movement of the beads 107 of the intermediate transfer belt 102 is restricted by the grooves 110 of the intermediate transfer belt drive roller 101, and a description thereof will be omitted.

According to the intermediate transfer part 100 of the second embodiment of the present invention, since the grooves 110 are provided on the circumferential surface of the intermediate transfer belt drive roller 101, the intermediate transfer belt drive roller 101 does not move in a direction in which the intermediate transfer belt 102 tends to deflect. Thus, the deflection of the intermediate transfer belt 102 is efficiently prevented, which restricts the position of the intermediate transfer belt 102.

Here, although, in the present embodiment, a description was given of the case where the grooves 110 are formed on both sides of the intermediate transfer belt drive roller 101, a similar effect can be obtained when a single groove 110 is formed on one side of the intermediate transfer belt drive roller 101. In such as case, the bead 107 can also be provided on one side of the intermediate transfer belt 102, which reduces a time required for attaching the bead 107 and simplifies a structure of a bead attaching apparatus.

It should be noted that although, in the above-mentioned embodiment, a description was given of a case in which the intermediate transfer belt 102 is supported by two axes, that is, the intermediate transfer belt drive roller 101 and the intermediate transfer belt driven roller 103, the present invention is applicable to a case where the intermediate transfer belt 102 is supported by more than three axes with the same effect.

Moreover, although, in the present embodiment, a description was given of a case where the present invention is applied to the intermediate transfer part 100 constituting the image forming part of the digital copy machine, the present invention is applicable to the conveyance belt 65, the conveyance belt drive roller 66 and the conveyance belt driven roller in the carry in/out part 6 of the ADF 3 with the same effect.

Third Embodiment

A digital copy machine according to a third embodiment of the present invention has the same structure as the digital copy machine according to the first embodiment of the present invention except for a part of the intermediate transfer part 100, and, thus, FIGS. 1, 2, 3 and 5A are used for the description of the third embodiment and the same component parts are given the same reference numerals.

Figure 7:
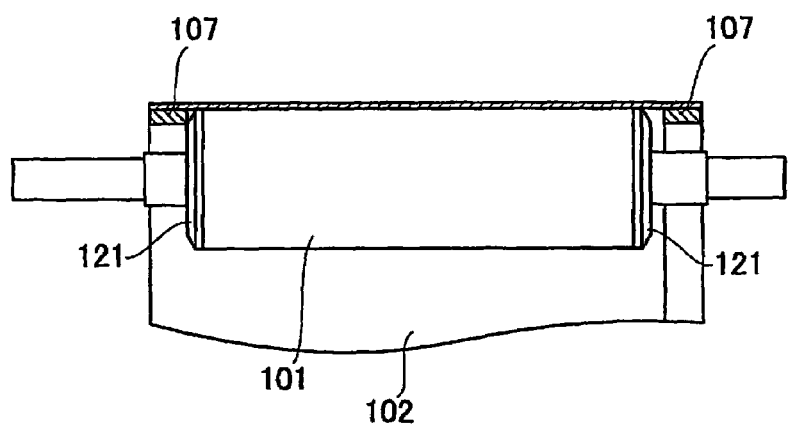
FIG. 7 shows a plan view of a part of an intermediate transfer part of a digital copy machine according to a third embodiment of the present invention.
Figure 8A:
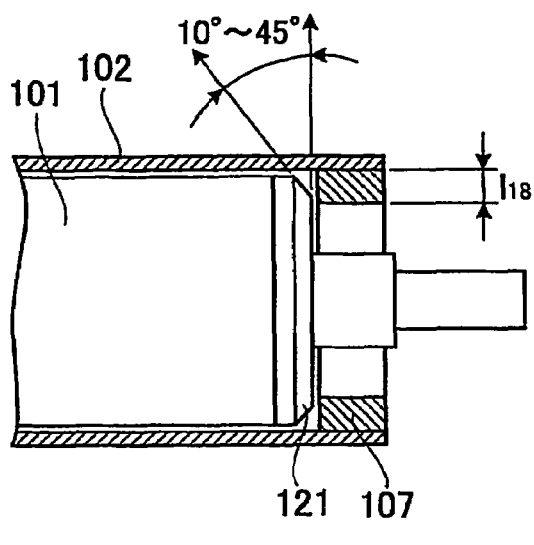
FIG. 8A is a plan view of a part of an intermediate transfer belt drive roller having a rotational member.
Figure 8B:
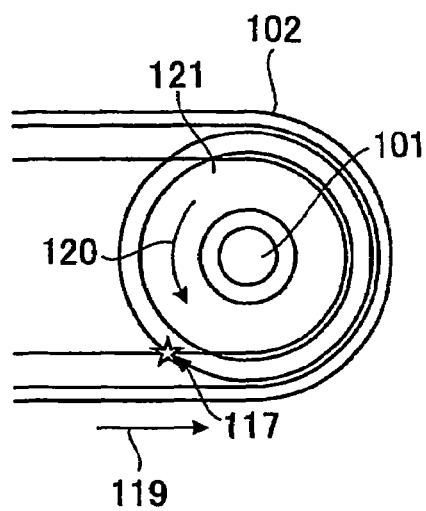
FIG. 8B is a side view of the part of the intermediate transfer belt drive roller shown in FIG. 8A.
Figure 8C:
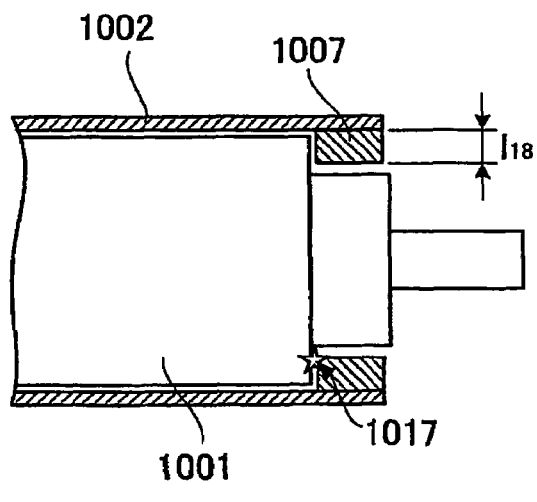
FIG. 8C is a plan view of a part of an intermediate transfer belt drive roller having no rotational member.
Figure 8D:
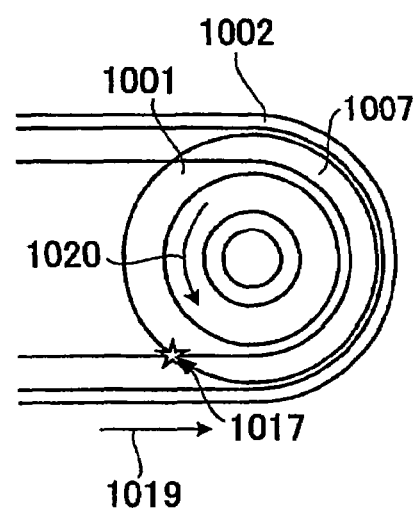
FIG. 8D is a side view of the part of the intermediate transfer belt drive roller shown in FIG. 8C.

FIG. 7 shows a plan view of a part of an intermediate transfer part of the digital copy machine according to the third embodiment of the present invention. FIGS. 8A and 8B show a part of an intermediate transfer belt drive roller having a rotational member. FIGS. 8C and 8D show a part of an intermediate transfer belt drive roller having no rotational member.

In the intermediate transfer part 100, rotational members 121 each having a tapered corner are attached to both ends of the intermediate transfer belt drive roller 101. The rotational members 121 may interfere with the beads while rotating with the intermediate transfer belt drive roller 101. A coefficient of friction μ1 between the intermediate transfer belt drive roller 101 and the beads 107 and a coefficient of friction μ2 between the rotational members and beads 107 are set to satisfy a relationship μ1>μ2. Additionally, a taper angle of the tapered surface of the rotational member 121 is set to 10, degrees to 45 degrees with respect to a side surface of the bead 107. Further, a height of the taper of the rotational member 121 is set smaller than a thickness $1_{18}$ of the bead 107.

According to the above-mentioned structure, if the intermediate transfer belt 102 moves to a side of the intermediate transfer belt drive roller 101 as indicated by an arrow 119 and the intermediate transfer belt drive roller 101 rotates as indicated by an arrow 120 even though the end of the intermediate transfer belt drive roller 101 interferes with the side surface of the bead 107 to restrict a deflection (a movement in a thrust direction) of the intermediate transfer belt 102, the intermediate transfer belt drive roller 101 and the intermediate transfer belt 102 are brought into contact with each other at a bead contact part 117. Then, in the bead contact part 117, the bead 107 is gradually brought into contact with the intermediate transfer belt drive roller 101 from an outer periphery side to an inner periphery side. At this time, due to the difference between the coefficient of friction μ1 and the coefficient of friction μ2, it can be prevented that the bead 107 climbs up the bead contact part 117 or overrides the rotational member 121. Moreover, a corner of the bead 107 is prevented from being caught by an edge of the bead 107 or the intermediate transfer belt drive roller 101, and the bead 107 is engaged with the rotational member 121 smoothly due to the rotation of the intermediate transfer belt drive roller 101.

On the other hand, if the rotational member having a low coefficient of friction is not attached to the intermediate transfer belt drive roller 1001 as shown in FIGS. 8C and 8D, or if a taper is not provided on a rotational member, a corner of the bead 1007 may climb up the side surface of the intermediate transfer belt drive roller 1001 at a bead contact part 1017. If the climbing up state of the corner of the bead 1007 continues, finally, the bead 1007 may override the circumferential surface of the intermediate transfer belt drive roller 1001. In FIGS. 8C and 8D. an arrow 1020 indicates a direction of rotation of the intermediate transfer belt drive roller 1001, and an arrow 1019 indicates a direction of conveyance by the intermediate transfer belt 1002. It should be noted that, at an end part of the intermediate transfer belt drive roller 1001 or a part of an inner surface part of the groove (corresponding to the groove 110 shown in FIG. 6) where the intermediate transfer belt 1002 interferes with the bead 1007, the coefficient of friction between the intermediate transfer belt drive roller 1001 and the intermediate transfer belt 1002 is set higher so that the drive force of the intermediate transfer belt drive roller 1001 is surely transmitted to the intermediate transfer belt 1002. Moreover, since the bead 1007 is desired to be made of a flexible material so as to acquire flexibility, a coefficient of friction between the intermediate transfer belt drive roller 1001 and the bead 1007 tends to be high.

As mentioned above, in the present embodiment, since the coefficient of friction μ2 between the rotational member 121 (corresponding to the end of the drive roller) and the bead 107 is set smaller than the coefficient of friction between the intermediate transfer belt drive roller 101 (corresponding to a center part of the drive roller) and the bead 107, occurrence of the phenomena of climbing up and overriding of the bead 107 can be prevented when the rotational member 121 contacts and interferes with the bead 107, while securing the driving force of the intermediate transfer belt 102 by the intermediate transfer belt drive roller 101. Furthermore, even when the groove for receiving the bead 107 is provided on the intermediate transfer belt drive roller 101, the same action and effect can be obtained while the wall surfaces of the groove restrict a deflection of the intermediate transfer belt 102.

Moreover, in the present embodiment, since the taper angle between the tapered surface formed on an end surface (corresponding to the end surface of the drive roller) of the rotational member 121 and the end surface of the intermediate transfer belt drive roller 101 is set in the predetermined range from 10 degrees to 45 degrees. It should be noted that if the taper angle formed on the rotational member 121 is smaller than 10 degrees, the above-mentioned function of the taper cannot be achieved, and when larger than 45 degrees, the corner of the bead 107 is pressed upward which causes the bead 107 to easily override the intermediate transfer belt drive roller 1001.

It should be noted that although, in the above-mentioned embodiment, a description was given of a case in which the intermediate transfer belt 102 is supported by two axes, that is, the intermediate transfer belt drive roller 101 and the intermediate transfer belt driven roller 103, the present invention is applicable to a case where the intermediate transfer belt 102 is supported by more than three axes with the same effect.

Moreover, although, in the present embodiment, a description was given of a case where the present invention is applied to the intermediate transfer part 100 constituting the image forming part of the digital copy machine, the present invention is applicable to the conveyance belt 65, the conveyance belt drive roller 66 and the conveyance belt driven roller in the carry in/out part 6 of the ADF 3 with the same effect.

Fourth Embodiment

A digital copy machine according to a fourth embodiment of the present invention has the same structure as the digital copy machine according to the first embodiment of the present invention except for a part of the intermediate transfer part 100, and, thus, FIGS. 1, 2, 3 and 5A are used for the description of the fourth embodiment and the same component parts are given the same reference numerals.

Figure 9A:
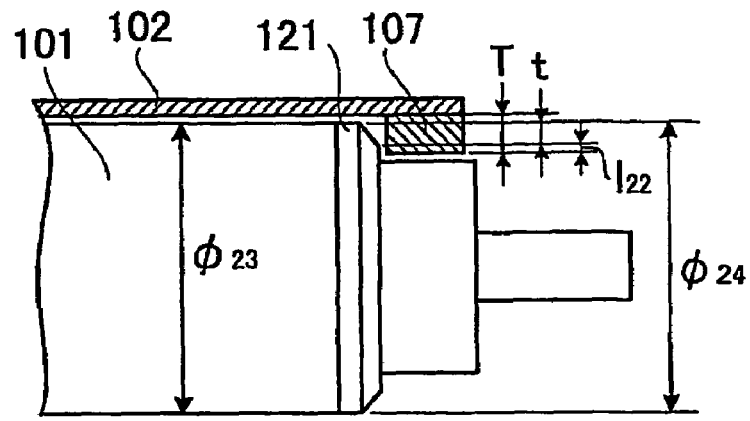
FIG. 9A is a side view of an end of an intermediate transfer belt drive roller of a digital copy machine according to a fourth embodiment of the present invention.

FIG. 9A shows a plan view of a part of the intermediate transfer part of the digital copy machine according to the fourth embodiment of the present invention.

In the intermediate transfer part 100, rotational members 121 each having a tapered corner are attached to both ends of the intermediate transfer belt drive roller 101. The rotational members 121 may interfere with the beads while rotating with the intermediate transfer belt drive roller 101. A coefficient of friction μ1 between the intermediate transfer belt drive roller 101 and the beads 107 and a coefficient of friction μ2 between the rotational members and beads 107 are set to satisfy a relationship μ1>μ2. Additionally, a taper angle of the tapered surface of the rotational member 121 is set to 10 degrees to 45 degrees with respect to a side surface of the bead 107. Further, in order to set the roller diameter $\phi_{23}$ of the intermediate transfer belt drive roller 101 and the diameter $\phi_{24}$ of the rotational member 121 approximately equal to each other, a tolerance of the diameter $\phi_{24}$ is set to ±1.0 mm with respect to the diameter $\phi_{24}$. It should be noted that it is more preferable that the diameter $\phi_{24}$ is within a range of −0.01 mm to −0.1 mm with respect to the diameter $\phi_{23}$. Moreover, an amount of engagement $I_{22}$ is set to a predetermined value so that the rotational member 121 and the bead 107 overlap with each other. It should be noted that since the bead 107 is located on an inner side of the intermediate transfer belt 102 and bends by interfering with the intermediate transfer belt drive roller 101 and the intermediate transfer belt driven roller 103, the thickness of the bead 107 must be made small. Therefore, the above-mentioned predetermined value is determined so that the thickness of the bead 107 can be set as small as possible while restricting a deflection of the intermediate transfer belt 102 by the rotational member 121 overlapping the bead 107. For example, supposing that the thickness (corresponding to $l_{18}$) of the bead 107 is T and a difference between the outer diameter of the rotational member 121 and the inner diameter of non-tapered part of the rotational member 121 is 2 t, it is made to establish a relationship T>t.

Figure 9B:
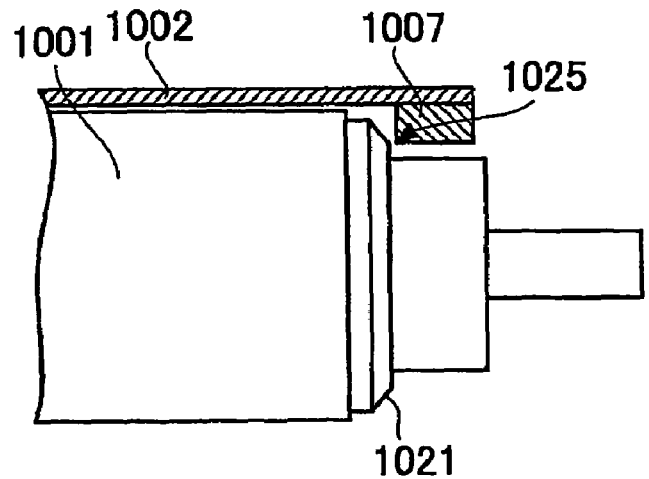
FIG. 9B is a side view of an end of an intermediate transfer belt drive roller.
Figure 9C:
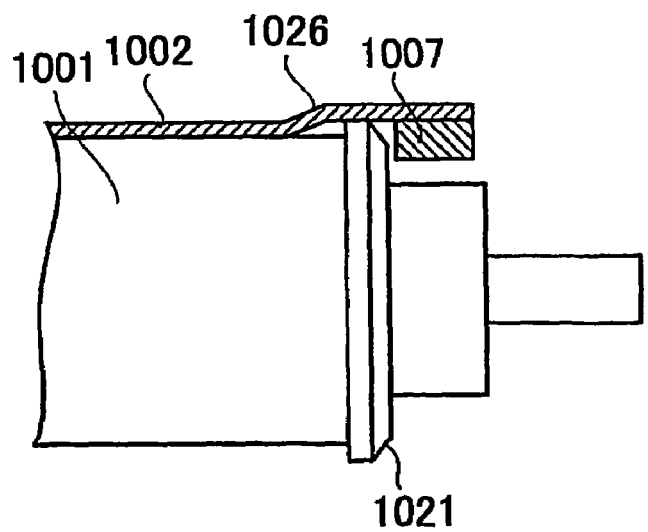
FIG. 9C is a side view of an end of an intermediate transfer belt drive roller.

On the other hand, as shown in FIG. 9B, if the diameter of the rotational member 1021 (corresponding to $\phi 24$ of FIG. 9A) is smaller than the diameter of the intermediate transfer belt drive roller 1001 ($\phi_{23}$ of FIG. 9A), and if the thickness of the bead 1007 is set as small as possible, there may be a case in which the overlapping amount of the side surface 1025 and the end surface of the rotational member 1021 becomes "0". Moreover, if the diameter of the rotational member 1021 (corresponding to $\phi_{24}$ of FIG. 9A) is larger than the diameter of the intermediate transfer belt drive roller 1001 ($\phi_{23}$ of FIG. 9A), as shown in FIG. 9C, the circumferential surface of the rotating member 1021 protrudes into the intermediate transfer belt 1002, which forms a protrusion 1026 in the intermediate transfer belt 1002. The protrusion 1026 may become a permanent deformation depending on the material of the intermediate transfer belt 1002, which results in deterioration of flatness of the intermediate transfer belt 1002.

As mentioned above, in the present embodiment, a taper is formed on the outer end (corresponding to the outer end of the drive roller) of the rotational member 121 and an engagement amount $l_{22}$ is set so that the non-tapered part of the rotational member 121 and the bead 107 overlap with each other, the edge line of the corner of the rotational member surely interfaces with the edge line of the corner of the rotational member 121 when the rotational member 121 is brought into contact with the bead 107, which prevents the bead 107 from climbing up or overriding.

Additionally, in the present embodiment, the intermediate transfer part 100 corresponding to the belt conveyance apparatus) is provided with the intermediate transfer belt drive roller 101 (corresponding the first rotational member 9 and a rotational member 121 (corresponding to the second rotational member), and the outer diameter $\phi_{23}$ of the rotational member 121 (corresponding to the second rotational member) is set in a range of ±1.0 mm with respect to the diameter $\phi_{24}$ of the intermediate transfer belt drive roller 101. Thus, the rotational member 121 protrudes from the surface of the intermediate transfer belt drive roller 101 or a sufficient engaging amount of the taper of the rotational member 121 and the bead 107 is acquired, which prevents the bead 107 from overriding the rotational member 121.

It should be noted that although, in the above-mentioned embodiment, a description was given of a case in which the intermediate transfer belt 102 is supported by two axes, that is, the intermediate transfer belt drive roller 101 and the intermediate transfer belt driven roller 103, the present invention is applicable to a case where the intermediate transfer belt 102 is supported by more than three axes with the same effect.

Moreover, although, in the present embodiment, a description was given of a case where the present invention is applied to the intermediate transfer part 100 constituting the image forming part of the digital copy machine, the present invention is applicable to the conveyance belt 65, the conveyance belt drive roller 66 and the conveyance belt driven roller in the carry in/out part 6 of the ADF 3 with the same effect.

Fifth Embodiment

A digital copy machine according to a fifth embodiment of the present invention has the same structure as the digital copy machine according to the first embodiment of the present invention except for a part of the intermediate transfer part 100, and, thus, FIGS. 1, 2, 3 and 5A are used for the description of the fifth embodiment and the same component parts are given the same reference numerals.

Figure 10:
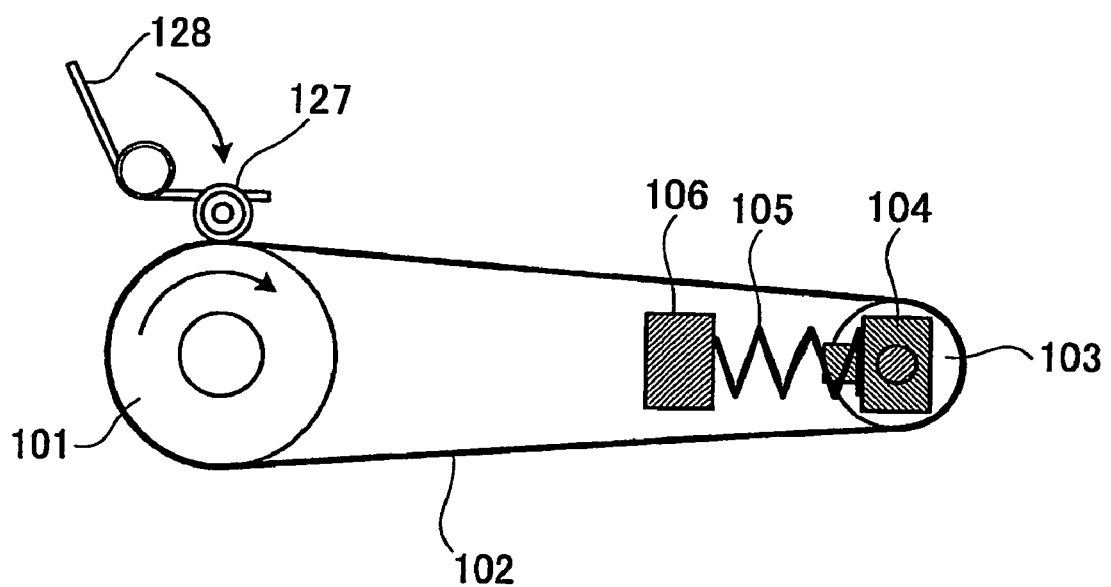
FIG. 10 is a side view of an intermediate transfer part of a digital copy machine according to a fifth embodiment of the present invention.

FIG. 10 shows a side view of a part of the intermediate transfer part of the digital copy machine according to the fifth embodiment of the present invention.

In the intermediate transfer part 100, a pressure roller 127 is provided at a position opposite to the intermediate transfer belt drive roller 101 with the intermediate transfer belt 102 interposed therebetween, ant is urged by a spring 128 so as to be in contact with the intermediate transfer belt drive roller 101.

According to this structure, slippage between the intermediate transfer belt 102 and the intermediate transfer belt drive roller 101 is prevented by adding a pressing force by the pressure roller 127 and the frictional force (gripping force) between the intermediate transfer belt drive roller 101 and the intermediate transfer belt 102. It should be noted that the operation shown in FIG. 5A is the same as in the present embodiment, and a description thereof will be omitted.

As mentioned above, in the fifth embodiment of the present invention, the pressure roller 127 and the spring 128 (corresponding to the pressing means) which together press the intermediate transfer belt 102 (corresponding to the conveyance belt) against the intermediate transfer belt drive roller 101 (corresponding to the drive roller) is provided, and the pressurization roller 127 is located opposite to the intermediate transfer belt drive roller 101 with the intermediate transfer belt 102 interposed therebetween, a pressure force generated between the intermediate transfer belt 102 and the intermediate transfer belt drive roller 101 can be increased without increasing a belt conveyance load and a cost increase of the intermediate transfer belt drive roller 101. Therefore, a sufficient frictional force can be maintained, which improves conveyance accuracy in the intermediate transfer part 100.

It should be noted that if the intermediate transfer belt 102 is driven by only the frictional force exerted from inner side of the intermediate transfer belt 102 by the intermediate transfer belt drive roller 101, a material of the intermediate transfer belt 102 is limited to a material which can acquire an electrostatic capacitance such as an electric charge and, thus, there is no room for selection due to other restrictions. Consequently, a high-coefficient of friction material provided on a surface of the intermediate transfer belt rive roller 101 is limited, which invites a cost increase of the intermediate transfer belt drive roller 101. Moreover, although it is considered to use a method in which a tension of the intermediate transfer belt drive roller 101 so as to improve the pressure of the intermediate transfer belt 102 to the intermediate transfer belt drive roller 101, such a method may increase a load to move the intermediate transfer belt 102 and it may require a rigidity of the roller and a rigidity of a support part that supports a roller or a belt.

It should be noted that although, in the above-mentioned embodiment, a description was given of a case in which the intermediate transfer belt 102 is supported by two axes, that is, the intermediate transfer belt drive roller 101 and the intermediate transfer belt driven roller 103, the present invention is applicable to a case where the intermediate transfer belt 102 is supported by more than three axes with the same effect.

Moreover, although, in the present embodiment, a description was given of a case where the present invention is applied to the intermediate transfer part 100 constituting the image forming part of the digital copy machine, the present invention is applicable to the conveyance belt 65, the conveyance belt drive roller 66 and the conveyance belt driven roller in the carry in/out part 6 of the ADF 3 with the same effect.

Sixth Embodiment

A digital copy machine according to a sixth embodiment of the present invention has the same structure as the digital copy machine according to the first embodiment of the present invention except for a part of the intermediate transfer part 100, and, thus, FIGS. 1, 2, 3 and 5A are used for the description of the sixth embodiment and the same component parts are given the same reference numerals.

Figures 11A, 11B:
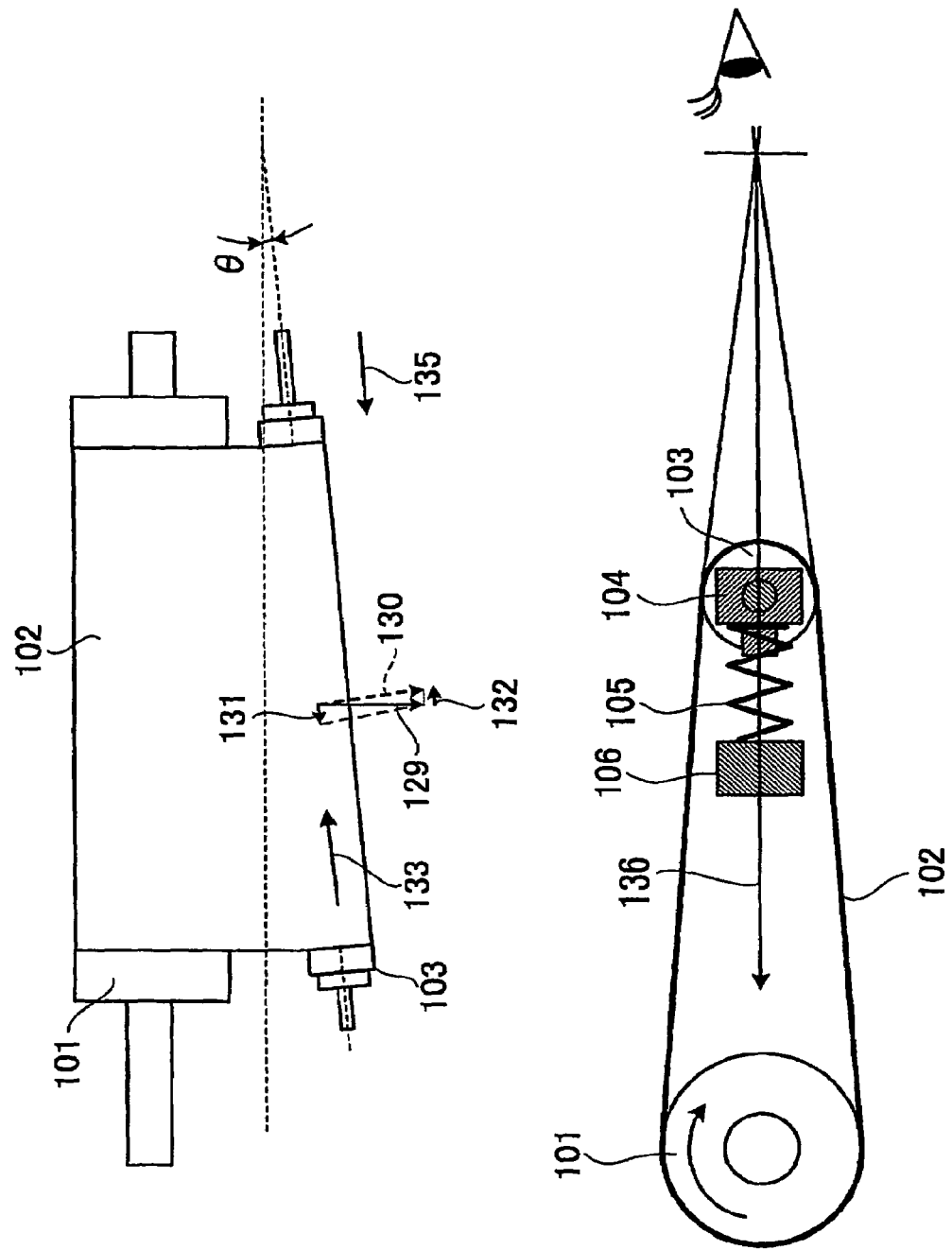
FIG. 11A is a front view of an intermediate transfer belt of a digital copy machine according to a sixth embodiment of the present invention when viewing in a direction of an arrow of FIG. 11B.
FIG. 11B is a side view of the intermediate transfer belt shown in FIG. 11A.

FIG. 11A shows an inclination of the axis of the intermediate transfer belt driven roller 103 with respect to the axis of the intermediate transfer belt drive roller 101 when viewing in a direction of an arrow 136 of FIG. 11B. In FIG. 11A, the axis of the intermediate transfer belt driven roller 103 and the axis of the intermediate transfer belt drive roller 101 are substantially perpendicular to a direction of conveyance of a transfer paper, and the axis of the intermediate transfer belt driven roller 103 is non-parallel to the axis of the intermediate transfer belt drive roller 101. It should be noted that a bead (such as the bead 107 shown in FIG. 2) is not formed on the intermediate transfer belt 102.

In the intermediate transfer part 100, as mentioned above, the axis of the intermediate transfer belt driven roller 103 is arranged so as to incline by an angle θ with respect to the axis of the intermediate transfer belt drive roller 101. When the intermediate transfer belt 102 is circularly driven by the intermediate transfer belt drive roller 101, the intermediate transfer belt 102 gives a force indicated by a vector 129 to the intermediate transfer belt driven roller 103 when it reaches the intermediate transfer belt driven roller 103. At this time, the intermediate transfer belt driven roller 103 is rotating in a direction indicated by a vector 130. There exists a vector angle difference corresponding to the angle θ between the vector 129 and the vector 130. Moreover, a rotational force of the intermediate transfer belt driven roller 103 is obtained by the circular drive of the intermediate transfer belt 102. The intermediate transfer belt 102 is rotating in a direction of the vector 130 while receiving a force expelling in the vector 129. Furthermore, the drive force which rotates the intermediate transfer belt driven roller 103 is transmitted due to the friction which exists between the intermediate transfer belt 102 and the intermediate transfer belt driven roller 103. Thus, since the axis of the intermediate transfer belt driven roller 103 inclines by the angle θ, the drive force of the intermediate transfer belt drive roller 101 is transmitted to the intermediate transfer belt driven roller 103 at a predetermined transmission efficiency while the intermediate transfer belt 102 slides on the intermediate transfer belt driven roller 103. in other words, the intermediate transfer belt 102 transfers the drive force while urging the intermediate transfer belt driven roller 103 in a direction indicated by an arrow 135 and vector 131. Thus, the thus-transmitted drive force routes the intermediate transfer belt driven roller 103. On the other hand, the intermediate transfer belt driven roller 103 rotates while urging the intermediate transfer belt 102 in a direction indicated by the vector 132. Here, the intermediate transfer belt 102 receives a force (hereinafter, may be referred to as "deflection force") in a direction indicated by an arrow 133 due to the direction of rotation of the intermediate transfer belt driven roller 103, and the intermediate transfer belt 102 moves in a rightward direction in the figure due to the deflection force. Therefore, the intermediate transfer belt 102 is caused to move in the rightward direction and the intermediate transfer belt driven roller 103 is caused to move in the leftward direction in the figure.

The above-mentioned deflection force is controllable by setting of the angle θ. This gives a greater influence than other factors when the intermediate transfer belt 102 moves in the thrust direction, the other factors including a difference in diameter between the intermediate transfer belt drive roller 101 and the intermediate transfer belt driven roller 103, a difference in direction of right-and-left (horizontal) of the intermediate transfer belt drive roller 101 and the intermediate transfer belt driven roller 103, and a difference in tension between the left and right of the intermediate transfer belt 102. Therefore, it becomes possible to control a direction of the deflection and the deflection force of the intermediate transfer belt 102 by appropriately setting an inclination in upward and downward directions of the axis of the intermediate transfer belt driven roller 103 to the axis of the intermediate transfer belt driven roller 103.

As mentioned above, in the sixth embodiment of the present invention, since the axis (corresponding to drive roller axis) of the intermediate transfer belt drive roller 101 and the axis (corresponding to the driven roller axis) are substantially perpendicular to the direction of conveyance of a transfer paper, and the axis of the intermediate transfer belt driven roller 103 is caused to be non-parallel to the axis of the intermediate transfer belt drive roller 101, the deflection force of the intermediate transfer belt 102 is controllable by controlling the inclination (angle θ) of the intermediate transfer belt drive roller 103 with respect to the intermediate transfer belt driven roller 103. Furthermore, it becomes unnecessary to consider specially about improvement in cylindricity of the intermediate transfer belt drive roller 101 and the intermediate transfer belt driven roller 103, management of the tension spring, improvement in dimension accuracy of the belt support part, etc., and a work and cost relating to those can be reduced.

It should be noted that although, in the above-mentioned embodiment, a description was given of a case in which the intermediate transfer belt 102 is supported by two axes, that is., the intermediate transfer belt drive roller 101 and the intermediate transfer belt driven roller 103, the present invention is applicable to a case where the intermediate transfer belt 102 is supported by more than three axes with the same effect.

Moreover, although, in the present embodiment, a description was given of a case where the present invention is applied to the intermediate transfer part 100 constituting the image forming part of the digital copy machine, the present invention is applicable to the conveyance belt 65, the conveyance belt drive roller 66 and the conveyance belt driven roller in the carry in/out part 6 of the ADF 3 with the same effect.

Seventh Embodiment

A digital copy machine according to a seventh embodiment of the present invention has the same structure as the digital copy machine according to the first embodiment of the present invention except for a part of the intermediate transfer part 100, and, thus, FIGS. 1, 2, 3 and 5A are used for the description of the seventh embodiment and the same component parts are given the same reference numerals.

Figure 12A:
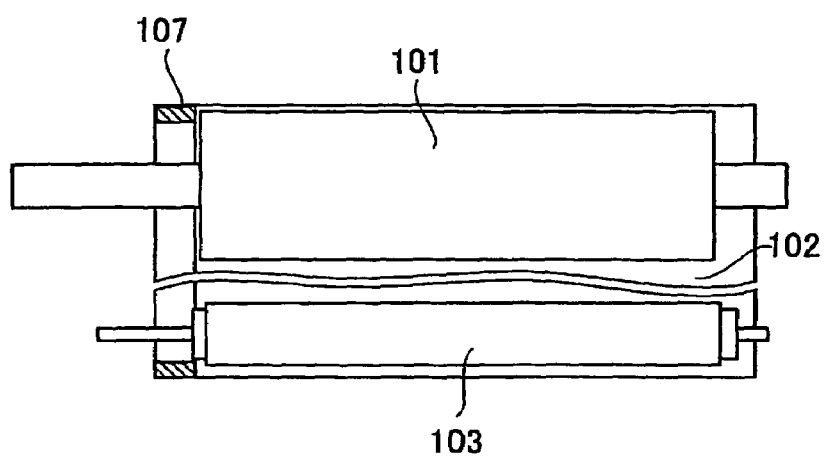
FIG. 12A is a plan view of a part of an intermediate transfer part of a digital copy machine according to a seventh embodiment of the present invention.
Figure 12B:
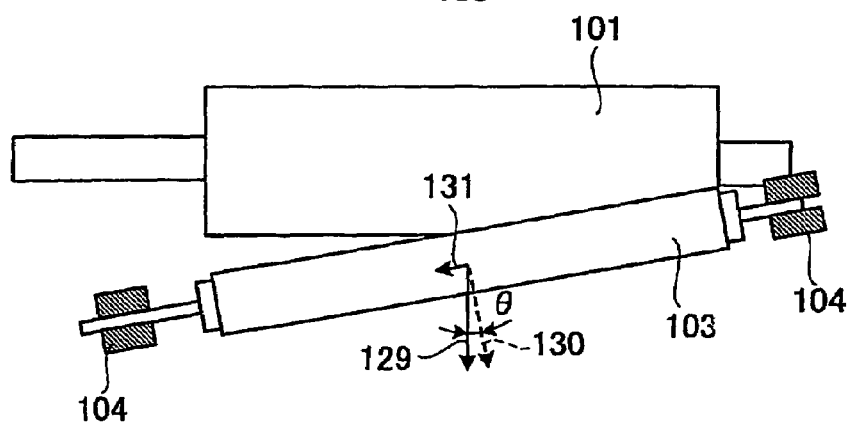
FIG. 12B is a front view of the intermediate transfer part shown in FIG. 12A.

FIG. 12A shows a plan view of a part of the intermediate transfer part 100. FIG. 12B shows an inclination of the axis of the intermediate transfer belt driven roller 103 with respect to the intermediate transfer belt drive roller 101 in a vertical direction. It should be noted that bead 107 is formed on one side (left side in the figure) of the intermediate transfer belt 102 in a direction of width.

In the present embodiment, similar to the above-mentioned sixth embodiment, the intermediate transfer belt 102 tends to move in the rightward direction in the figure, and the intermediate transfer belt driven roller 103 tends to move in the leftward direction in the figure. At this timed, since the left end of the intermediate transfer belt driven roller 103 interferes with the bead 107, the deflection force of the intermediate transfer belt 102 to move in the right ward direction and the deflection force of the intermediate transfer belt driven roller 103 to move in the leftward direction are cancelled with each other. Since the intermediate transfer belt 102 tends to move in the rightward direction, a position of the intermediate transfer belt 102 in the thrust direction is determined by an interference of the bead 107 with the left end of the intermediate transfer belt drive roller 101. Therefore, the function to receive the deflection force of the intermediate transfer belt 102 and to determine a position of the intermediate transfer belt 102 can be achieved by providing the bead 107 on only one side (let side in the figure) of the intermediate transfer belt in a direction of width.

As mentioned above, according to the seventh embodiment of the present invention, since the bead 107 is formed on one side of the inner surface of the intermediate transfer belt 102 (corresponding to the conveyance belt) and the bead 107 is caused to interfere with lower one of the opposite ends of the intermediate transfer belt driven roller 103, the intermediate transfer belt 102 moves in the rightward direction in the figure when, for example, the angle θ shown in FIG. 11A is set. Thus, the deflection of the intermediate transfer belt 102 can be controlled by the interference of the bead 107 with the left end (corresponding to the above-mentioned lower end) of the intermediate transfer belt drive roller 101. Therefore, by forming the bead 107 on one side of the intermediate transfer belt 102 in the direction of width, work an cost for attaching the bead 107 to the intermediate transfer belt 102 are reduced, and productivity is improved.

It should be noted that although, in the above-mentioned embodiment, the description was given of the case where the intermediate transfer belt driven roller 103 inclines by the angle θ in the leftward direction in the figure and the bead 107 is formed on the left side of the intermediate transfer belt drive roller 101 in the figure, the present invention is not limited to such a structure and the same effects can be achieved in a case where the intermediate transfer belt driven roller 103 inclines by the angle θ in the rightward direction in the figure and the bead 107 is formed on the right side of the intermediate transfer belt drive roller 101 in the figure.

It should be noted that although, in the above-mentioned embodiment, a description was given of a case in which the intermediate transfer belt 102 is supported by two axes, that is, the intermediate transfer belt drive roller 101 and the intermediate transfer belt driven roller 103, the present invention is applicable to a case where the intermediate transfer belt 102 is supported by more than three axes with the same effect.

Moreover, although, in the present embodiment, a description was given of a case where the present invention is applied to the intermediate transfer part 100 constituting the image forming part of the digital copy machine, the present invention is applicable to the conveyance belt 65, the conveyance belt drive roller 66 and the conveyance belt driven roller in the carry in/out part 6 of the ADF 3 with the same effect.

Eighth Embodiment

A digital copy machine according to an eighth embodiment of the present invention has the same structure as the digital copy machine according to the first embodiment of the present invention except for a part of the intermediate transfer part 100, and, thus, FIGS. 1, 2, 3 and 5A are used for the description of the eighth embodiment and the same component parts are given the same reference numerals.

Figure 13:
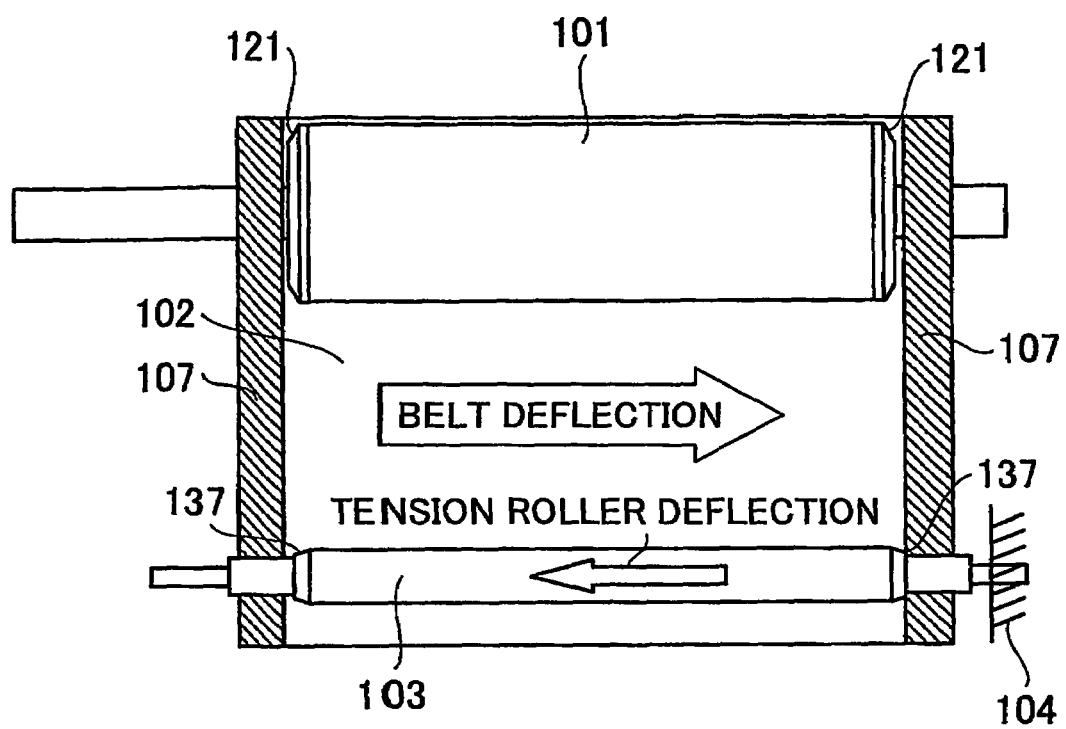
FIG. 13 is a plan view of a part of an intermediate transfer part of a digital copy machine according to an eighth embodiment of the present invention.

FIG. 13 shows a plan view of a part of the intermediate transfer part 100. In FIG. 13, similar to the seventh embodiment, the axis of the intermediate transfer belt driven roller 103 inclines with respect to the intermediate transfer belt drive roller 101 in a vertical direction. It should be noted that beads 107 are formed on both sides (left and right sides in the figure) of the intermediate transfer belt 102 in a direction of width, respectively.

In the intermediate transfer part 100, the rotational member 121 having a tapered surface is attached to each end of the intermediate transfer belt drive roller 101. Furthermore, a taper 137 is formed on each side of the intermediate transfer belt driven roller 103. The angle between the taper 137 with respect to a non-tapered portion of the intermediate transfer belt driven roller 103 is set in a range from 10 degrees to 45 degrees. It should be noted that the intermediate transfer belt drive roller 101 restricts a position of the intermediate transfer belt 102 in the thrust direction, and, further, the intermediate transfer belt driven roller 103 restricts a deflection of the intermediate transfer belt 102 generated due to a twist of the intermediate transfer belt driven roller 101, etc. Therefore, the intermediate transfer belt driven roller 103 also has a part that interferes with the bead 107 of the intermediate transfer belt 102, and it is possible that climbing up or override of the bead 107 occurs.

As mentioned above, if the axis of the intermediate transfer belt driven roller 103 inclines with respect to the axis of the intermediate transfer belt driven roller 101, a direction of deflection of the intermediate transfer belt 102 and a direction of deflection of the intermediate transfer belt driven roller 103 are opposite to each other depending on a direction of inclination of the intermediate transfer belt driven roller 103. Here, since a deflection of the intermediate transfer belt 102 is fundamentally restricted by the ends of the intermediate transfer belt driven roller 103, interference of the beads 107 with the intermediate transfer belt driven roller 103 becomes intensive. Thus, the climbing or override of the intermediate transfer belt 102 is prevented by the taper provided in the rotational member 121 attached to the intermediate transfer belt drive roller 101, and also the climbing or override of the intermediate transfer belt 102 due to interference between the tapered surface formed on the intermediate transfer belt driven roller 103 and the bead 107 is prevented.

As mentioned above, in the eighth embodiment of the present invention, since taper is formed on the ends of the intermediate transfer belt driven roller 103 (corresponding to the driven roller) and the non-tapered portion of the intermediate transfer belt driven roller 103 and the bead 107 are caused to overlap with each other in a non-operated state, when the intermediate transfer belt driven roller 103 rotates and is brought into contact with the bead 107, the edge line of the corner of the bead 107 and the edge line of the tapered portions of the intermediate transfer belt driven roller 103 surely interfere with each other, which prevents the climbing or override of the bead 107.

Moreover, in the present embodiment, since the taper angle of the taper formed on the end of the intermediate transfer belt driven roller 103 with respect to the end surface of the intermediate transfer belt driven roller 103 is set in a range from 10 degrees to 45 degrees, the tapered surface of the end of the intermediate transfer belt driven roller 103 surely contacts the bead 107 and receives the deflection force of the intermediate transfer belt 102, which prevents climbing or override of the bead 107.

It should be noted that although, in the above-mentioned embodiment, a description was given of a case in which the intermediate transfer belt 102 is supported by two axes, that is, the intermediate transfer belt drive roller 101 and the intermediate transfer belt driven roller 103, the present invention is applicable to a case where the intermediate transfer belt 102 is supported by more than three axes with the same effect.

Moreover, although, in the present embodiment, a description was given of a case where the present invention is applied to the intermediate transfer part 100 constituting the image forming part of the digital copy machine, the present invention is applicable to the conveyance belt 65, the conveyance belt drive roller 66 and the conveyance belt driven roller in the carry in/out part 6 of the ADF 3 with the same effect.

Ninth Embodiment

A digital copy machine according to a ninth embodiment of the present invention has the same structure as the digital copy machine according to the first embodiment of the present invention except for a part of the intermediate transfer part 100, and, thus, FIGS. 1, 2, 3 and 5A are used for the description of the ninth embodiment and the same component parts are given the same reference numerals.

Figure 14:
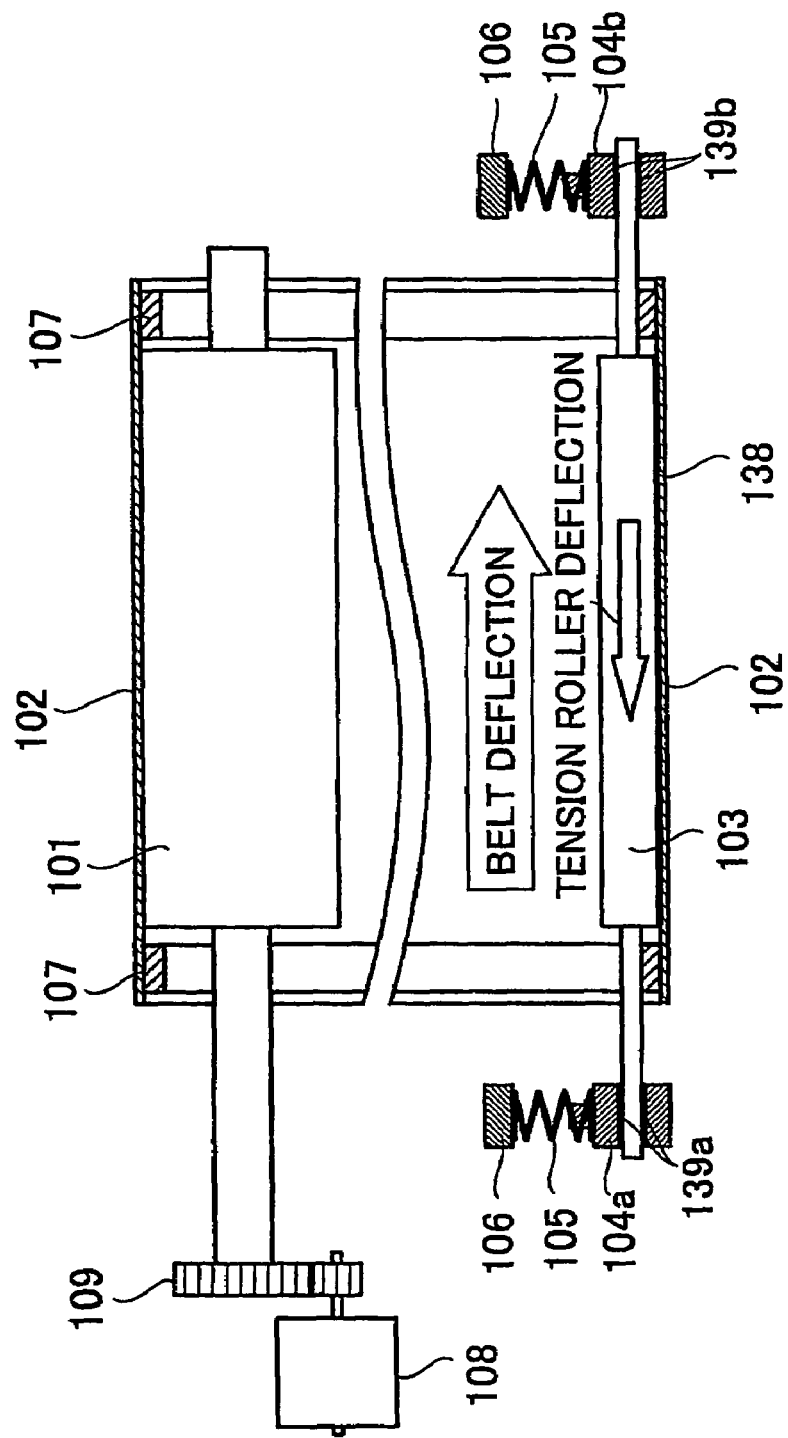
FIG. 14 is a plan view of a part of an intermediate transfer part of a digital copy machine according to a ninth embodiment of the present invention.

FIG. 14 shows a plan view of a part of the intermediate transfer part 100. In FIG. 14, similar to the seventh embodiment, the axis of the intermediate transfer belt driven roller 103 inclines with respect to the intermediate transfer belt drive roller 101 in a vertical direction. It should be noted that beads 107 are formed on both sides (left and right sides in the figure) of the intermediate transfer belt 102 in a direction of width, respectively.

In the intermediate transfer part 100, as mentioned above, a shaft of the intermediate transfer belt driven roller 103 is attached to the driven roller bearings 104a and 104b. In the present embodiment, frictional force F1, F2 and F3 are set to satisfy a relationship F1>F2+F3, where F1 is a frictional force in a friction part 138 between the intermediate transfer belt driven roller 103 and the intermediate transfer belt 102, F2 is a frictional force in a frictional part 139a between the shaft of the intermediate transfer belt driven roller 103 and the driven roller bearing 104, and F3 is a frictional force in a frictional part 139b between the shaft of the intermediate transfer belt driven roller 103 and the driven roller bearing 104b.

This is based on the following reasons. As mentioned above, if the driven roller 103 is arranged in a twisted position with respect to the intermediate transfer belt drive roller 101, a direction of deflection of the intermediate transfer belt 102 and a direction of deflection off the intermediate transfer belt driven roller 103 are opposite to each other. There is no force that against the deflection force of the intermediate transfer belt 102 caused by the twist of the intermediate transfer belt driven roller 103. On the other hand, a force against the deflection force of the intermediate transfer belt driven roller 103 due to a deflection of the intermediate transfer belt 102 is the above-mentioned frictional forces F2 and F3 that are generated between the shaft of the intermediate transfer belt driven roller 103 and each of the driven roller bearings 104a and 104b. That is, a force of moving the intermediate transfer belt driven roller 103 in the thrust direction corresponds to the above-mentioned F1, and a frictional force against the frictional force F1 corresponds to the frictional forces F2 and F3. Therefore, in order to cancel the deflection force of the intermediate transfer belt 102 by the intermediate transfer belt driven roller 103, the intermediate transfer belt driven roller 103 must move and interfere with the bead 107. Thus, if the frictional forces F1, F2 and F3 are maintained to satisfy the relationship F1>F2+F3, the intermediate transfer belt driven roller 103 moves in the thrust direction, which prevents the intermediate transfer belt 102 from being deflected.

As mentioned above, in the ninth embodiment, since the frictional force in the thrust direction between the driven roller bearings 104a and 104b (corresponding to the driven roller support means) and the shaft of the intermediate transfer belt driven roller 103 (included in the driven roller) is smaller than the frictional force between the intermediate transfer belt driven roller 103 and the intermediate transfer belt 102, a time for the intermediate transfer belt driven roller 103 to move to a position where it interfaces with the bead 107 is reduced, and a force of receiving a deflection force of the intermediate transfer belt 102 by the intermediate transfer belt driven roller 103 is reduced, thereby effectively preventing a deflection of the intermediate transfer belt 102.

It should be noted that although, in the above-mentioned embodiment, a description was given of a case in which the intermediate transfer belt 102 is supported by two axes, that is, the intermediate transfer belt drive roller 101 and the intermediate transfer belt driven roller 103, the present invention is applicable to a case where the intermediate transfer belt 102 is supported by more than three axes with the same effect.

Moreover, although, in the present embodiment, a description was given of a case where the present invention is applied to the intermediate transfer part 100 constituting the image forming part of the digital copy machine, the present invention is applicable to the conveyance belt 65, the conveyance belt drive roller 66 and the conveyance belt driven roller in the carry in/out part 6 of the ADF 3 with the same effect.

The present invention is not limited to the specifically disclosed embodiments, and variations and modifications may be made without departing from the scope of the present invention.

INDUSTRIAL APPLICABILITY

As mentioned above, since in the belt conveyance apparatus according to the present invention, the driven roller (corresponding to the intermediate transfer belt driven roller) is rotatably supported, and the driven roller support means (corresponding to the driven roller bearings) is provided to movably support the driven roller in the thrust direction, and the drive roller (corresponding to the intermediate transfer belt drive roller) and the ends of the driven roller interfere with the conveyance belt (corresponding to the intermediate transfer belt) so as to restrict a deflection of the conveyance belt in the thrust direction and the driven roller is movable in the thrust direction against the deflection of the conveyance belt, there is the effect that the deflection of the conveyance belt can be corrected by the movement of the driven roller. Thus, the present invention is effective and useful for a belt conveyance apparatus having an endless belt, a drive roller driving the endless belt and at least one driven roller engaged with the endless belt, and an image forming apparatus having such a belt conveyance apparatus.

The invention claimed is:

1. A belt conveyance apparatus comprising:
   a drive roller;
   a driven roller rotating in accordance with an operation of the drive roller;
   a conveyance belt engaged with the drive roller for rotationally driving the conveyance belt and the driven roller, the conveyance belt being provided with a first bead and a second bead formed on an inner side thereof; and
   driven roller support means for rotatably supporting the driven roller, the driven roller support means being configured to allow the driven roller to move in a thrust direction,
   wherein, in operation, ends of the drive roller and the driven roller interface with the first bead and second bead of the conveyance belt so as to allow and restrict a deflection of the conveyance belt in the thrust direction, and the driven roller is movable in the thrust direction according to a deflection of the conveyance belt, and
   wherein a frictional force in the thrust direction between the driven roller support means and the driven roller is smaller than a frictional force of the driven roller and the conveyance belt.

2. The belt conveyance apparatus as claimed in claim 1, wherein the first and second beads are formed on each side of the conveyance belt in a direction of width thereof, and a clearance between a first end of the driven roller and the driven roller support means on a side of the first end of the driven roller is greater than a sum of a first clearance between a second end of the driven roller and the second bead which is located on a side of the second end of the driven roller, a second clearance between a first end of the drive roller and the first bead which is located on a side of the first end of the drive roller, and a third clearance between a second end of the drive roller and the second bead which is located on a side of the second end of the drive roller.

3. The belt conveyance apparatus as claimed in claim 1, wherein at least one of the first bead and second bead is provided on an inner side of the conveyance belt, and a groove is formed on a circumferential surface of the drive roller so that the at least one of the first bead and second bead is brought into engagement with the groove.

4. The belt conveyance apparatus as claimed in claim 1, wherein a coefficient of friction between an end portion of the drive roller and at least one of the first bead and second bead is set smaller than a coefficient of friction of a center portion of the drive roller and the at least one of the first bead and second bead.

5. The belt conveyance apparatus as claimed in claim 4, wherein a taper is formed on an end surface of the drive roller so that, in an unoperated state, a non-tapered portion of the end surface overlaps a side surface of at least one of the first bead and second bead.

6. The belt conveyance apparatus as claimed in claim 5, further comprising a first rotational member constituting the center portion of the drive roller and a second rotational member constituting the end portion of the drive roller, wherein an outer diameter of the second rotational member is within a range of ±1.0 mm of an outer diameter of the first rotational member.

7. The belt conveyance apparatus as claimed in claim 5, wherein a taper angle of the taper with respect to the end surface of the drive roller is set in a range from 10 degrees to 45 degrees.

8. The belt conveyance apparatus as claimed in claim 1, wherein an axis of the drive roller and an axis of the driven roller are substantially perpendicular to a direction of conveyance of a paper sheet, and the axis of the driven roller is inclined with respect to the axis of the drive roller.

9. The belt conveyance apparatus as claimed in claim 8, wherein at least one of die first bead and second bead is formed on one side of an inner surface of the conveyance belt so that, in an operated stated, the at least one of the first bead and second bead interferes with a lower one of opposite ends of the driven roller in operation.

10. The belt conveyance apparatus as claimed in claim 9, wherein a taper is formed on an end surface of the drive roller so that, in an unoperated stated, a non-tapered portion of the end surface overlaps a side surface of the at least one of the first bead and second bead.

11. The belt conveyance apparatus as claimed in claim 10, wherein a taper angle of die taper with respect to the end surface of the drive roller is set in a range from 10 degrees to 45 degrees.

12. The belt conveyance apparatus as claimed in claim 1, wherein a coefficient of friction between the drive roller and the conveyance belt, is greater than a coefficient of friction between the driven roller and the conveyance belt.

13. The belt conveyance apparatus as claimed in claim 1, further comprising pressing means for pressing the conveyance belt to the drive roller, wherein the pressing means is located at a position opposite to the drive roller with the conveyance belt interposed therebetween.

14. An image forming apparatus comprising:
    image forming means for forming an image; and
    a belt conveyance apparatus including:
    a drive roller;
    a driven roller rotating in accordance with an operation of the drive roller;
    a conveyance belt engaged with the drive roller for rotationally driving the conveyance belt and the driven roller, the conveyance belt being provided with a first bead and a second bead formed on an inner side thereof; and
    driven roller support means for rotatably supporting the driven roller, the driven roller support means being configured to allow the driven roller to move in a thrust direction,
    wherein, in operation, ends of the drive roller and the driven roller interface with the first bead and second bead of the conveyance belt so as to allow and restrict a deflection of the conveyance belt in the thrust direction, and the driven roller is movable in the thrust direction according to a deflection of the conveyance belt, and
    wherein a frictional force in the thrust direction between the driven roller support means and the driven roller is smaller than a frictional force of the driven roller and the conveyance belt.

15. The image forming apparatus as claimed in claim 14, wherein the first and second beads are formed on each side of the conveyance belt in a direction of width thereof, and a clearance between a first end of the driven roller and the driven roller support means on a side of the first end of the driven roller is greater than a sum of a first clearance between a second end of the driven roller and the second bead which is located on a side of the second end of the driven roller, a second clearance between a first end of the drive roller and the first bead which is located on a side of the first end of the drive roller, and a third clearance between a second end of the drive roller and the second bead which is located on a side of the second end of the drive roller.

16. The image forming apparatus as claimed in claim 14, wherein at least one of the first bead and second bead is provided on an inner side of the conveyance belt, and a groove is formed on a circumferential surface of the drive roller so that the at least one of the first bead and second bead is brought into engagement with the groove.

17. The image forming apparatus as claimed in claim 14, wherein a coefficient of friction between an end portion of the drive roller and at least one of the first bead and second bead is set smaller than a coefficient of friction of a center portion of the drive roller and the at least one of the first bead and second bead.

18. The image forming apparatus as claimed in claim 17, wherein a taper is formed on an end surface of the drive roller so that, in an unoperated state, a non-tapered portion of the end surface overlaps a side surface of the at least one of the first bead and second bead.

19. The image forming apparatus as claimed in claim 18, further comprising a first rotational member constituting the center portion of the drive roller and a second rotational member constituting the end portion of the drive roller, wherein an outer diameter of the second rotational member is within a range of ±1.0 mm of an outer diameter of the first rotational member.

20. The image forming apparatus as claimed in claim 18, wherein a taper angle of the taper with respect to the end surface of the drive roller is set in a range from 10 degrees to 45 degrees.

21. The image forming apparatus as claimed in claim 14, wherein an axis of the drive roller and an axis of the driven roller are substantially perpendicular to a direction of conveyance of a paper sheet, and the axis of the driven roller is inclined with respect to the axis of the drive roller.

22. The image forming apparatus as claimed in claim 21, wherein the bead is formed on one side of an inner surface of the conveyance belt so that, in an operated stated, the bead interferes with a lower one of opposite ends of the driven roller in operation.

23. The image forming apparatus as claimed in claim 22, wherein a taper is formed on an end surface of the drive roller so that, in an unoperated stated, a non-tapered portion of the end surface overlaps a side surface of the at least one of the first bead and second bead.

24. The image forming apparatus as claimed in claim 23, wherein a taper angle of the taper with respect to the end surface of the drive roller is set in a range from 10 degrees to 45 degrees.

25. The image forming apparatus us claimed in claim 14, wherein a coefficient of friction between the drive roller and the conveyance belt is greater than a coefficient of friction between the driven roller and the conveyance belt.

26. The image forming apparatus as claimed in claim 14, further comprising pressing means for pressing the conveyance belt to the drive roller, wherein the pressing means is located at a position opposite to the drive roller with the conveyance belt interposed therebetween.

* * * * *